(12) United States Patent
Uehara et al.

(10) Patent No.: US 6,533,094 B2
(45) Date of Patent: Mar. 18, 2003

(54) CLUTCH COVER ASSEMBLY

(75) Inventors: Hiroshi Uehara, Hirakata (JP); Norihisa Uenohara, Ibaraki (JP)

(73) Assignee: Exedy Corporation, Osaka (JP)

( * ) Notice: Subject to any disclaimer, the term of this patent is extended or adjusted under 35 U.S.C. 154(b) by 20 days.

(21) Appl. No.: 09/813,897

(22) Filed: Mar. 22, 2001

(65) Prior Publication Data

US 2002/0139632 A1 Oct. 3, 2002

Related U.S. Application Data

(63) Continuation-in-part of application No. 09/457,301, filed on Dec. 9, 1999, now Pat. No. 6,264,019.

(30) Foreign Application Priority Data

| Mar. 30, 2000 | (JP) | ......................................... | 2000-093358 |
| Apr. 19, 2000 | (JP) | ......................................... | 2000-117786 |
| Apr. 19, 2000 | (JP) | ......................................... | 2000-117787 |

(51) Int. Cl.⁷ .............................................. F16D 13/75
(52) U.S. Cl. .................................. 192/70.25; 192/111 A
(58) Field of Search .......................... 192/70.25, 111 A, 192/70.29, 70.3, 89.24

(56) References Cited

U.S. PATENT DOCUMENTS

| 4,207,972 | A | * | 6/1980 | Zeidler | .................. | 192/111 A |
| 5,450,934 | A | * | 9/1995 | Maucher | .................. | 192/70.25 |
| 5,513,736 | A | * | 5/1996 | Mizukami | ............... | 192/111 A |
| 5,531,308 | A | | 7/1996 | Gochenour et al. | | |
| 5,564,541 | A | | 10/1996 | Gochenour et al. | | |
| 5,564,542 | A | | 10/1996 | Gochenour et al. | | |
| 5,566,804 | A | | 10/1996 | Gochenour et al. | | |
| 5,593,015 | A | * | 1/1997 | Kosumi et al. | .......... | 192/70.27 |
| 5,690,203 | A | * | 11/1997 | Link et al. | ............... | 192/111 A |
| 5,904,233 | A | * | 5/1999 | Hashimoto | ............... | 192/111 A |

* cited by examiner

*Primary Examiner*—Richard M. Lorence
(74) *Attorney, Agent, or Firm*—Shinjyu Global IP Counselors, LLP

(57) ABSTRACT

A clutch cover assembly is provided having a wear compensating mechanism to compensate wear of a friction member. In one embodiment, the wear compensating mechanism is configured to compensate wear of a friction member by moving a support member on a clutch cover side. The wear compensating mechanism is configured to reduce the number of parts in a clutch cover assembly. In one embodiment, the wear compensating mechanism is configured to compensate wear of a friction member by moving a support member on a clutch cover side. Basically, the wear compensating mechanism has a biasing mechanism for adjusting the position of a fulcrum point of the lever members and a detecting mechanism for detecting the wear amount of the friction member. The biasing mechanism utilizes an adjustment ring, a fulcrum ring and an adjustment spring or biasing member.

27 Claims, 14 Drawing Sheets

CLUTCH COVER ASSEMBLY

CROSS-REFERENCE TO RELATED APPLICATIONS

This application is a continuation-in-part application of U.S. patent application Ser. No. 09/457,301, filed on Dec. 9, 1999 now U.S. Pat. No. 6,264,019. The entire disclosure of U.S. patent application Ser. No. 09/457,301 is hereby incorporated herein by reference.

1. Field of the Invention

This invention generally relates to a clutch cover assembly. More specifically, the present invention relates to a clutch cover assembly provided with a wear compensating mechanism, which can move a fulcrum of a pushing member toward a friction member by an amount corresponding to an amount of wear occurred in the friction member.

2. Background Information

A clutch cover assembly of a clutch device is attached to a flywheel of an engine. The clutch cover assembly operates to press a friction facing of a clutch disk assembly against the flywheel by an elastic or spring force of a diaphragm spring or the like for transmitting a drive force of an engine to a transmission. Specifically, the diaphragm spring or the like pushes a friction member of a clutch disk assembly against the flywheel for transmitting a drive power of the engine toward a transmission. In this clutch device, when the friction facing of the friction member wears to a predetermined extent or wears beyond the predetermined extent, the friction member can no longer be used. If use of the friction member continues after such predetermined amount of wear, the position of the diaphragm spring of the clutch cover assembly changes to cause disadvantageous change in pushing load. Therefore, the clutch disk assembly must be replaced with a new clutch disk assembly when the wear occurs to the predetermined extent or more. It has been desired to increase the use time of the clutch disk or the replacement cycle, and therefore the lifetime of the clutch.

For increasing the lifetime of the clutch, it is important in the clutch disk assembly to increase an effective service thickness of the friction facing of the friction member in the clutch disk assembly. In view of this increased thickness, the friction facing is fixed to a cushioning plate without using a rivet or the like according to one of several known methods of attachment.

In the clutch cover assembly, it is necessary to return or restore the attitude (orientation) of a spring such as a diaphragm spring to the initial attitude (orientation) when the friction facing of the friction member is worn. For this purpose, the clutch cover assembly is provided with a wear compensating mechanism. The wear compensating mechanism determines an amount of wear of the friction facing. The wear compensating mechanism can move a fulcrum (i.e., a fulcrum ring on the pressure plate side, or a support mechanism on the clutch cover side) of the spring such as a diaphragm spring in accordance with the determined amount of wear. Thereby, the attitude (orientation) of the diaphragm spring or the like can be kept in a constant position or maintained in an initial attitude (orientation) independently of the wear of the friction facing of the friction member. Therefore, the friction facing of the clutch disk assembly can be used to the maximum extent.

In a clutch cover assembly disclosed in Japanese Laid-Open Patent Publication No. 8-170652, a pressing member or a pushing mechanism is formed of a spring and a lever member for applying a pressing force to a pressure plate. The wear compensating mechanism is a mechanism for moving a fulcrum or support mechanism on the clutch cover side toward the friction facing of the friction member in accordance with the amount of wear of the friction facing of the friction member. This wear compensating mechanism is primarily formed of a support member, a biasing mechanism, and a wear detecting mechanism. The support member supports a fulcrum of a lever member on the clutch cover side. The biasing mechanism biases or urges the support member toward the friction member. The wear detecting mechanism detects an amount of friction member wear and allows movement of the pressure plate toward the clutch cover in accordance with the amount of wear.

The biasing mechanism is formed of two ring members having a wedge mechanism with a plurality of inclined surfaces, which are in complementary contact with each other, to form a wedge mechanism, and a spring for biasing the ring member on the clutch cover side in the rotating direction. The spring and wedge mechanism act to move the other ring member and a support member toward the friction member.

The wear detecting mechanism is formed of a cylindrical member, which is axially movably and frictionally engaged with an aperture in the clutch cover, and a bolt which extends from the pressure plate. The bolt has a head in contact with a side of the cylindrical member remote from the friction member. An axial space corresponding to a release stroke of the pressure plate is maintained between the pressure plate and the cylindrical member. The pressure plate is always biased away from the friction member by a plurality of strap plates. When the biasing force of the diaphragm spring is released and therefore the clutch enters the clutch released state, the pressure plate moves away from the friction member, and comes into contact with a friction member side of the cylindrical member.

When the friction member is worn, the pressure plate moves toward the flywheel. Furthermore, the pressure plate moves a bushing relative to the clutch cover by a distance corresponding to the amount of wear of the friction member. As a result, the axial distance between the pressure plate and the cylindrical member is the same as before the wearing of the friction member. When the clutch releasing operation is then performed, the cylindrical member stops the axial movement of the pressure plate. The position where the pressure plate stops is shifted by the amount of wear toward the friction member side from the position before wearing. In other words, the stop position is shifted by a distance corresponding to the wear amount toward the friction member from that in the clutch released state before wearing. Therefore, the axial space corresponding to the amount of wear of the friction member is formed between the pressure plate and the lever member. As a result, the biasing mechanism can move the support member in the axial direction, until the radially outer portion of the lever member comes into contact with the pressure plate when it moves a distance corresponding to the amount of wear.

According to the wear compensating mechanism in the foregoing conventional clutch cover assembly, the amount of wear is detected from the axial space between the pressure plate and the cylindrical member engaged with the clutch cover. The movement and stopping of the support member are performed between the support member and the pressure plate. According to this structure, the pressure plate is moved toward the friction member due to, e.g., vibrations applied thereto in the clutch releasing operation. An excessively large space is then formed between the pressure plate and the support member so that the support member may move a distance larger than the predetermined distance toward the pressure plate. When such over-adjusting occurs, the position of the spring applying a biasing force to the pressure plate changes from the initial state so that the pressing load cannot be constant.

The wear compensating mechanism of the conventional clutch cover assembly is provided with the fulcrum ring for supporting the lever member in addition to the first and second rings. In other words, since the wear compensating mechanism in the conventional clutch cover assembly uses the two ring members, it requires a large number of parts and complicated structures.

In view of the above, there exists a need for a clutch cover assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a wear compensating mechanism, which can move the support member on the clutch cover side for compensating wear of the friction member. More specifically, the wear compensating mechanism is designed to accurately maintain the amount of movement of the support member on the clutch cover side at a desired value.

An object of the invention is to provide a wear compensating mechanism for compensating for wear in the friction member by moving a support member on a clutch cover side. More specifically, the object is to provide a mechanism, which can accurately ensure an intended amount of movement of the support member on the clutch cover side.

An object is to maintain precisely a desired amount of fulcrum movement on a clutch cover side of a pressing member that moves in a wear compensating mechanism.

A further object of the present invention is to provide a clutch cover assembly having a wear compensating mechanism with reduced the number of parts.

An object of the present invention is provide a clutch cover assembly having a wear compensating mechanism, which moves the support member on the clutch cover side for compensating wear of the friction member, while using a fewer number of parts in the wear compensating mechanism.

According to a first aspect of the present invention, a clutch cover assembly is attached to a flywheel for releasably engaging a friction member with the flywheel. The clutch cover assembly of this first aspect of the present invention includes a clutch cover, a pressure plate, a pushing member and a wear compensating mechanism. The clutch cover rotates together with the flywheel. The pressure plate is disposed close to the friction member, rotates together with the clutch cover, but is axially movable with respect to the clutch cover. The pushing member is a member for applying a pushing force directed toward the friction member to the pressure plate. The wear compensating mechanism is a mechanism arranged on the clutch cover, for supporting the pushing member and moving a support position of the pushing member toward the friction member when wear occurs on the friction member. The wear compensating mechanism includes a first inclined surface formed on the friction member side of the clutch cover, and extending in the rotating direction, a first ring member arranged non-rotatably and axially movably with respect to the clutch cover, and having on the clutch cover side a second inclined surface being in complementary contact with the first inclined surface, a biasing member for biasing the first ring member in the rotating direction with respect to the clutch cover to move the first ring member axially away from the clutch cover, and a restricting mechanism being in contact with the friction member side of the first ring member for preventing movement of the first ring member toward the friction member, and allowing movement of the first ring movement toward the friction member when the friction member is worn.

When the friction member is worn in this clutch cover assembly, the restricting mechanism allows the movement of the first ring member toward the friction member by an amount corresponding to the amount of wear. Therefore, the first ring member biased by the biasing member moves toward the friction member. In the above operation, an axial space for allowing movement of the first ring member is formed between the restricting mechanism and the first ring member. Accordingly, even when the pressure plate axially moves due to vibrations supplied thereto during the clutch releasing operation, the shift of the pressure plate does not change the axial space. Thus, an amount of axial movement of a fulcrum of the pushing member can be kept accurate.

According to a second aspect of the present invention, the clutch cover assembly of the first aspect of the present invention further has such a feature that the restricting mechanism has a wear amount detecting member. The wear amount detecting member is axially movably and frictionally engaged with the clutch cover, is in contact with the surface on the friction member side of the first ring member for restricting movement of the first ring member toward the friction member, and moves together with the pressure plate toward the friction member to form a space with respect to the first ring member when the friction member is worn.

According to a third aspect of the present invention, the clutch cover assembly of the first or second aspect of the present invention further has such a feature that the friction compensating mechanism further has a second ring member. The second ring member has a support portion that is in contact with the friction member side of the first ring member, is non-rotatably and axially movably engaged with the clutch cover, and has a support portion for supporting the pushing member.

A clutch cover assembly according to a fourth aspect of the present invention is attached to a flywheel for releasably engaging a friction member with the flywheel. The clutch cover assembly includes a clutch cover, a pressure plate, a pushing member and a wear compensating mechanism. The clutch cover rotates together with the flywheel. The pressure plate is disposed close to the friction member, rotates together with the clutch cover, but is axially movable with respect to the clutch cover. The pushing member is a member for applying a pushing force directed toward the friction member to the pressure plate. The wear compensating mechanism is a mechanism on the clutch cover for supporting the pushing member arranged, and moving a support position of the pushing member toward the friction member when wear occurs on the friction member. The wear compensating mechanism is a mechanism for supporting the pushing member arranged on the clutch cover, and moving a support position of the pushing member toward the friction member by an amount corresponding to an amount of wear when the wear occurs on the friction member. The wear compensating mechanism includes a first ring member arranged rotatably on the friction member side of the clutch cover, and having on the friction member side an inclined surface extending in the rotating direction; a second ring member arranged on the friction member side of the first ring member, non-rotatably and axially movably engaged with the clutch cover, having on the clutch cover side a complementary inclined surface being in complementary contact with the inclined surface, and having on the friction member side a support portion supporting the pushing member; and a biasing member for biasing the first ring member in the rotating direction with respect to the clutch cover to move axially the second ring member away from the first ring member.

In this clutch cover assembly, the first ring member is biased by the biasing member to rotate with respect to the second ring member. Thereby, the second ring member is moved toward the friction member by an axial force applied through the inclined surface. As described above, the wear compensating mechanism is primarily formed of the first and second ring members, and therefore requires fewer parts than the prior art.

According to a fifth aspect of the present invention, the clutch cover assembly of the fourth aspect of the present invention further has such a feature that the wear compensating mechanism further has a restricting mechanism. The restricting mechanism is in contact with the friction member side of the first ring member to prevent movement of the first ring member toward the friction member side, and allows movement of the first ring member toward the friction member side when the friction member wears.

According to a sixth aspect of the present invention, the clutch cover assembly of the fifth aspect of the present invention further has such a feature that the restricting mechanism has a wear amount detecting member. The wear amount detecting member is axially movably and frictionally engaged with the clutch cover, is in contact with the surface on the friction member side of the first ring member for restricting movement of the first ring member toward the friction member, and moves together with the pressure plate toward the friction member to form a space with respect to the first ring member when the friction member is worn.

A clutch cover assembly according to a seventh aspect of the present invention is attached to a flywheel for releasably engaging a friction member with the flywheel, and includes a clutch cover, a pressure plate, a pushing member and a wear compensating mechanism. The clutch cover rotates together with the flywheel. The pressure plate is disposed close to the friction member, rotates together with the clutch cover, but is axially movable with respect to the clutch cover. The pushing member is a member for applying a pushing force directed toward the friction member to the pressure plate. The wear compensating mechanism is arranged on the clutch cover, and supports the pushing member. The wear compensating mechanism is a mechanism for moving the support position of the pushing member toward the friction member side when the friction member is worn. The wear compensating mechanism has a first inclined surface formed integrally with the surface on the friction member facing side of the clutch cover and extending in the rotating direction, a first ring member having a second inclined surface being in complementary contact with said first inclined surface, and being axially movable and rotatable with respect to said clutch cover, and a biasing member for biasing said first ring member in the rotating direction with respect to said clutch cover to move said first ring member axially away from said clutch cover.

In this clutch cover assembly, when the friction member wears, the wear compensating mechanism moves the support position of the pushing member toward the friction member side. This wear compensating operation is performed by the axial movement of the first ring member, which simultaneously rotates with respect to the clutch cover. In this clutch cover assembly, since one of the inclined surfaces of the wedge mechanism is integrally formed with the clutch cover, the whole structure requires a reduced number of parts.

According to an eighth aspect of the present invention, the wear compensating mechanism of the clutch cover assembly of the seventh aspect of the present invention further includes a second ring member. The second ring member is arranged in contact with the friction member side of the first ring member, and is non-rotatably and axially movably engaged with the clutch cover. The second ring member has a support portion for supporting the pushing member. In this clutch cover assembly, when the first ring member axially moves while rotating with respect to the clutch cover for the wear compensating operation, the second ring member axially moves without rotation with respect to the clutch cover. Since the second ring member does not rotate with respect to the clutch cover, the support portion supporting the pushing member does not move in the rotating direction.

According to a ninth aspect of the present invention, the clutch cover assembly of the eighth aspect of the present invention further has such a feature that the biasing member is configured to function between the first and second ring members. In this clutch cover assembly, since the first and second ring members do not axially move relatively to each other, the biasing member functioning between them can stably maintain its attitude.

According to a tenth aspect of the present invention, the clutch cover assembly of the ninth aspect of the present invention further has such a feature that the biasing member is disposed in a space formed between the first and second ring members. In this clutch cover assembly, the biasing member is disposed between the first and second ring members so that the required space can be small.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only, and not for the purpose of limiting the invention as defined by the appended claims and their equivalents.

First Embodiment

Referring initially to FIGS. 1–7, a clutch device 1 is illustrated in accordance with a first embodiment of the invention. The clutch device 1 is employed in a vehicle, and particularly a large vehicle such as a truck. The clutch device 1 is a device that transmits and/or intercepts torque from a flywheel 2 of an engine to an input shaft 3 of a transmission, as necessary.

Figure 1:
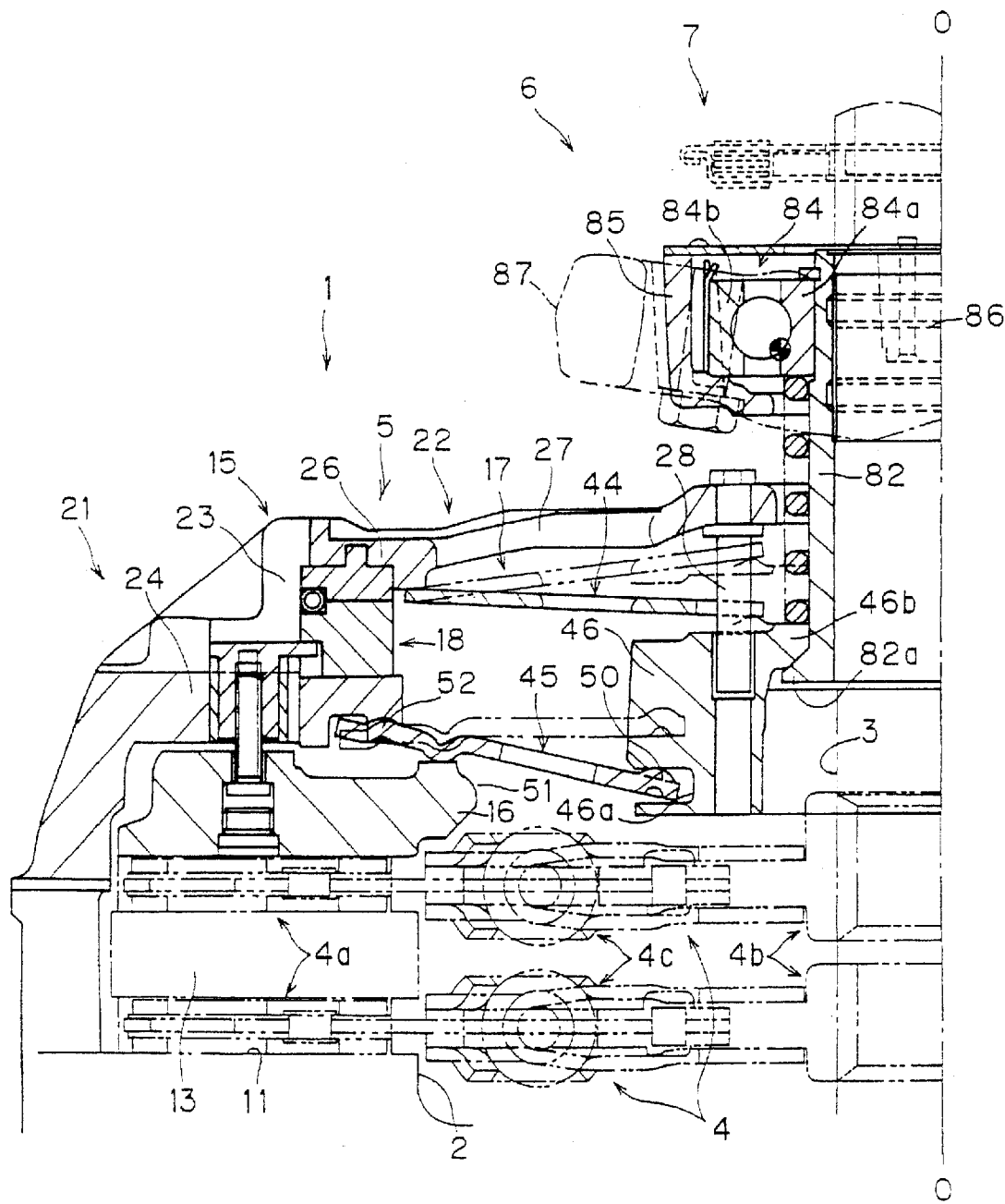
FIG. 1 is a partial schematic cross sectional view of a clutch device employing a clutch cover assembly of a first embodiment of the present invention in a clutch engaged state before wear has occurred.
Figure 2:
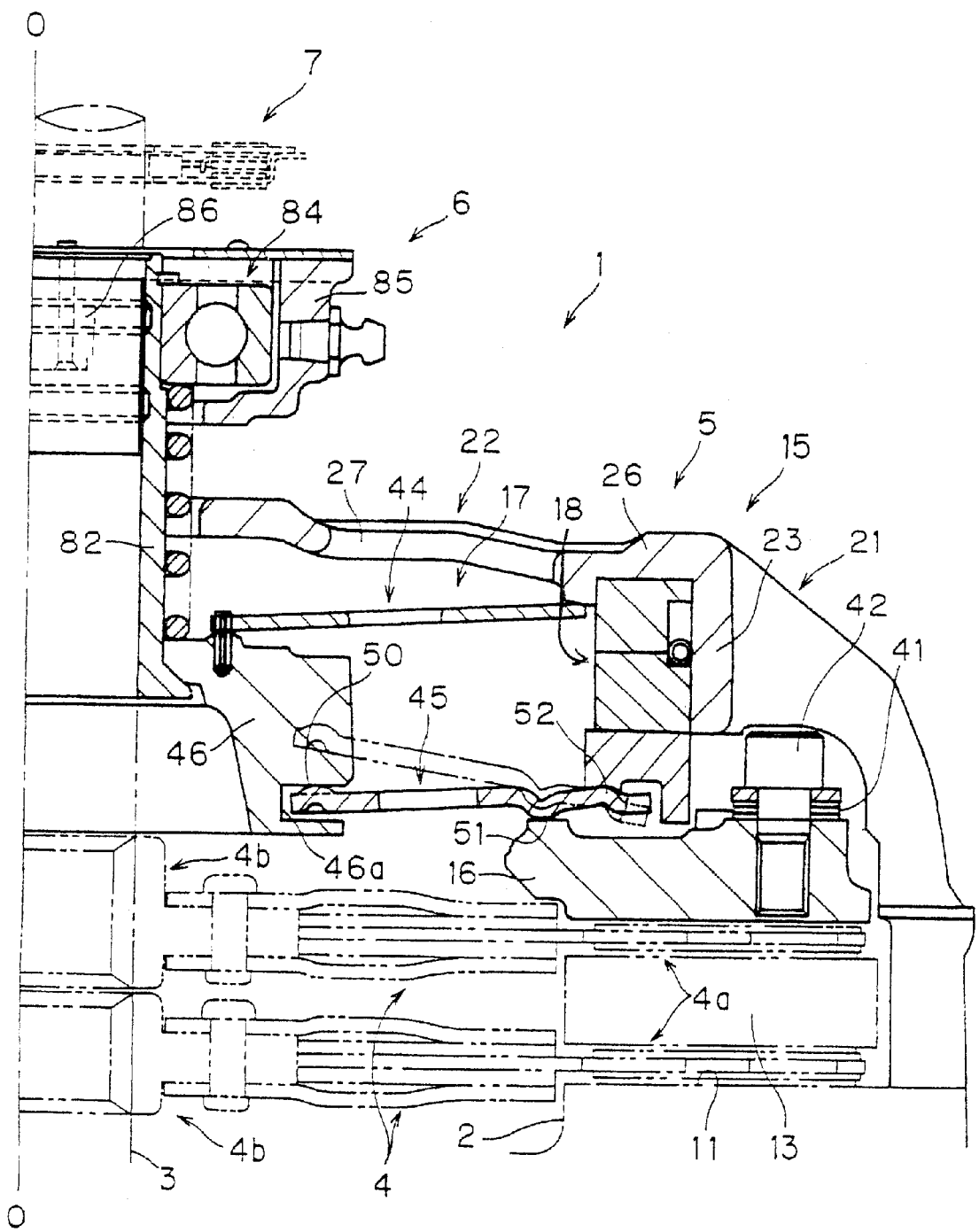
FIG. 2 is a partial schematic cross sectional view of the clutch device employing the clutch cover assembly of the first embodiment of the present invention in the clutch engaged state after wear has occurred.
Figure 4:
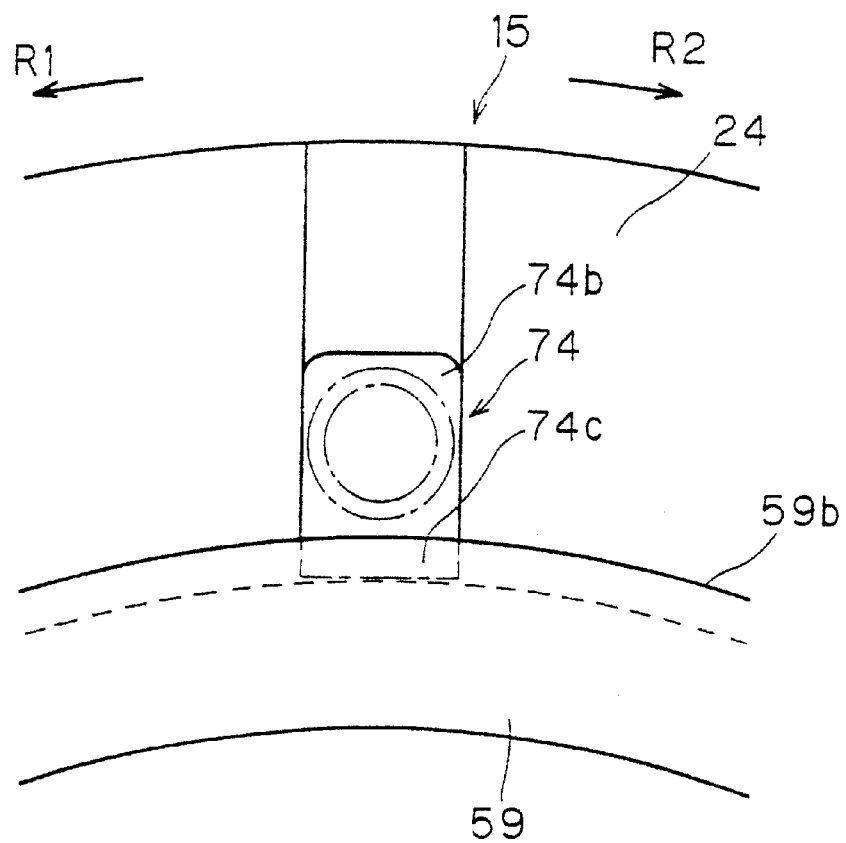
FIG. 4 is an enlarged partial elevational view of a portion of a clutch cover of the clutch cover assembly shown in FIGS. 1–3.
Figure 5:
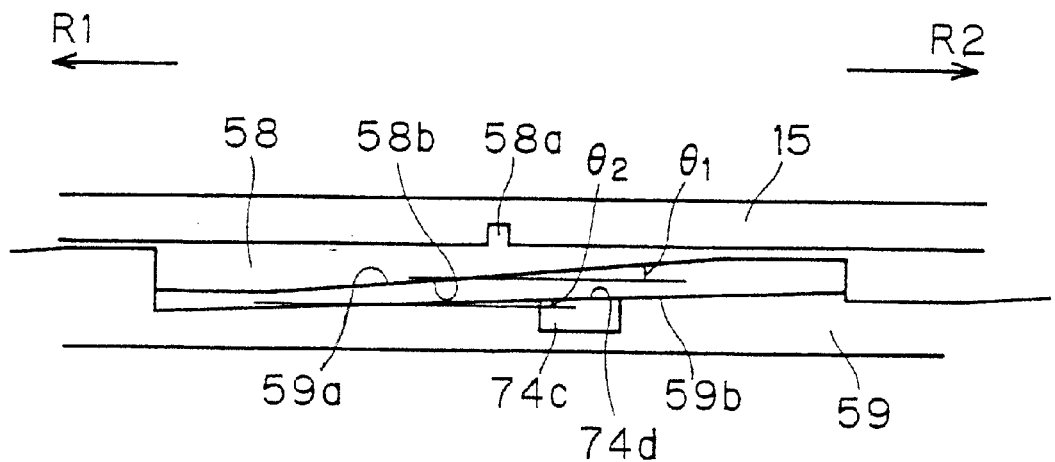
FIG. 5 is an enlarged partial schematic view of a wedge mechanism formed with two kinds of inclined surfaces used in the wear compensating mechanism of the clutch cover assembly shown in FIGS. 1–3.

The clutch device 1 is primarily formed of a pair of clutch disk assemblies 4, a clutch cover assembly 5 and a release device 6. As seen in FIGS. 1 and 2, a center line O—O indicates a rotation axis of the clutch device 1. The lower side in FIG. 1 will be referred to herein as a first axial side (engine side), while the upper side will be referred to herein as a second axial side (transmission side). In FIGS. 4 and 5, a direction R1 indicated by arrows is a rotating direction of the clutch device 1, and a direction R2 indicated by arrows is a reverse direction of the clutch device 1. When the clutch device 1 is engaged before wear occurs in the clutch disk assemblies 4, the various members of the clutch device 1 take the positions and attitudes shown in FIG. 1. When the clutch device 1 is engaged and wear has occurred in the clutch disk assemblies 4 to a certain extent, the various members of the clutch device 1 take the positions and attitudes shown in FIG. 2. The transmission provided with the clutch device 1 is of a type not having a synchronous mechanism or synchronizer, and therefore, the clutch device 1 is provided with a clutch brake 7, which will be described later.

The flywheel 2 is a circular disk-shaped member that is attached to an end of a crank shaft (not shown) of the engine. The flywheel 2 is provided with an annular flat frictional surface 11 at the second axial side of the radially outer portion.

The clutch disk assemblies 4 are disposed close to the second axial side of the flywheel 2. The clutch disk assemblies 4 are configured to be coupled to the flywheel 2 for transmitting the torque of the engine to the transmission input shaft 3. Preferably, two clutch disk assemblies 4 are employed in this clutch device 1, with each having a pair of friction facings 4a (friction member) arranged at its radially outer portion, a hub 4b coupled to the transmission input shaft 3, and a damper mechanism 4c elastically coupling the friction facings 4a to the hub 4b in the rotating direction. One of the friction facings 4a of one of the clutch disk assemblies 4 is disposed close to the friction surface 11 of the flywheel 2. One of the friction facings 4a of the other clutch disk assembly 4 is remote from the friction surface 11 of the flywheel 2, and is located on the second axial side with respect to the flywheel 2 so as to engage a pressure plate 16. An intermediate plate 13 is disposed axially between the adjacent friction facings 4a of the two clutch disk assemblies 4. The intermediate plate 13 is nonrotatable but is axially movable with respect to the clutch cover 15, which will be described later.

Figure 3:
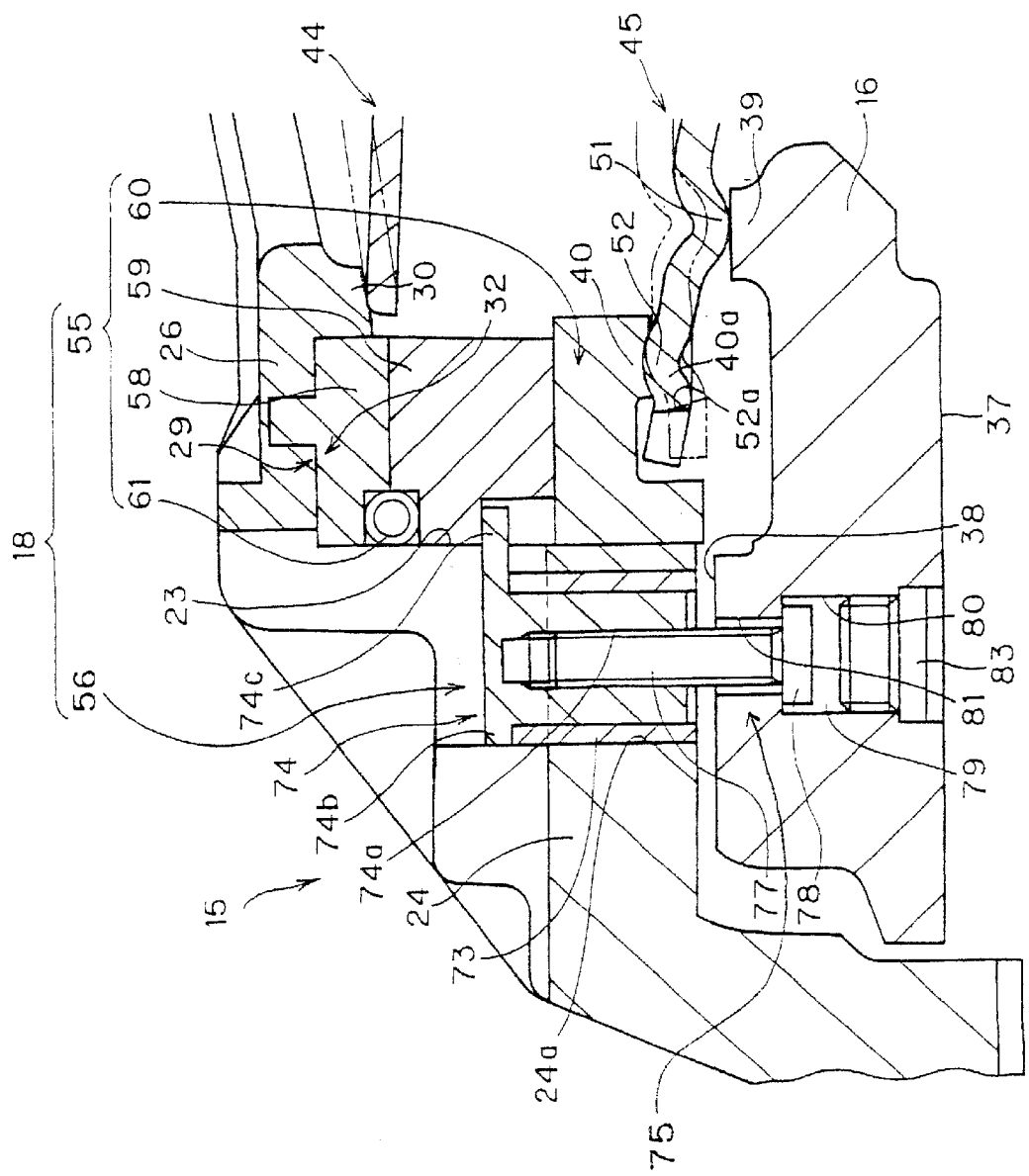
FIG. 3 is an enlarged partial schematic cross sectional view of a wear compensating mechanism of the clutch cover assembly shown in FIG. 1.

The clutch cover assembly 5 is a device for transmitting and interrupting the torque of the flywheel 2 to the clutch disk assembly 4. The clutch cover assembly 5 is attached to the flywheel 2. As shown in FIG. 3, the clutch cover assembly 5 basically includes the clutch cover 15, a pressure plate 16, a pushing mechanism 17 and a wear compensating mechanism 18.

The clutch cover 15 is an annular member fixedly coupled to the flywheel 2. More specifically, the radially outer portion of the clutch cover 15 is fixedly coupled to the flywheel 2 by bolts. The clutch cover 15 covers the outer periphery of the clutch disk assemblies 4. The clutch cover 15 is located on the second axial side of the clutch disk assemblies 4. In this manner, the clutch cover 15 is axially opposed to the friction surface 11 of the flywheel 2.

The clutch cover 15 basically includes a radially outer covering portion 21, a disk-shaped portion 22 and a cylindrical portion 23 formed between these portions 21 and 22. The radially outer covering portion 21 has a substantially cylindrical form for covering the outer periphery of the pressure plate 16, and has a radially outer end fixed to the flywheel 2 by bolts (not shown) in a conventional manner. The radially outer covering portion 21 has recesses at several portions to form radially outward openings. Referring to FIG. 3, the radially outer covering portion 21 is provided with a plurality of flat portions 24 located radially outside the cylindrical portion 23. The flat portions 24 are continuous to the end on the first axial side of the cylindrical portion 23. The flat portions 24 are axially opposed to a surface 38, on the second axial side, of the radially inner portion of the pressure plate 16 with a space therebetween.

The disk-shaped portion 22 extends radially inward from the end, on the second axial side, of the radially outer covering portion 21. The disk-shaped portion 22 has the inner periphery neighboring to the outer periphery of the input shaft 3. The disk-shaped portion 22 is provided at its radially middle portion with a plurality of circumferentially spaced apertures 27, and also has an annular portion 26, which forms the radially outer portion of the disk-shaped portion 22. The annular portion 26 is located radially and immediately inside the cylindrical portion 23. Rod-like members 28 are fixedly coupled to the portion of the disk-shaped member 22 near its inner periphery. Each rod-like member 28 extends from the radially inner end of the clutch cover 15 toward the first axial side.

As shown in FIG. 3, an accommodating portion 29 is formed in a position radially inside the cylindrical portion 23 of the clutch cover 15 for accommodating a biasing mechanism 55 of the wear compensating mechanism 18, which will be described later. Thus, the accommodating portion 29 is located on the first axial side of the annular portion 26. The annular portion 26 is provided at its inner periphery with an annular projection 30 projecting in the first axial direction. An annular groove 32 is defined between the cylindrical portion 23 and the annular projection 30.

The pressure plate 16 is an annular member, which is located radially inside the clutch cover 15 and axially between the clutch cover 15 and the friction facing 4a of the clutch disk assembly 4 on the second axial side of intermediate member 13. The surface on the first axial side of the pressure plate 16 forms an annular, flat pushing surface 37. The pressure plate 16 is provided at its second axial side with a second axial side surface 38, which is opposed to the clutch cover 15. Further, an annular support portion 39 is formed radially inside the second axial side surface 38. The support portion 39 projects toward the second axial side beyond the other portions.

The pressure plate 16 is coupled to the clutch cover 15 by a plurality of strap plates 41 as shown in FIG. 2. More specifically, the strap plates 41 are circumferentially and equally spaced around the clutch cover 15. Each strap plate 41 is fixed at one of its ends on the R2 side to the radially outer portion of the pressure plate 16 by a bolt 42, and is also fixed at the other of its ends on the R1 side by a bolt (not shown) to the clutch cover 15. Owing to this coupling arrangement, the pressure plate 16 can rotate in the R1 direction together with the clutch cover 15. In the clutch engaged state, the strap plates 41 are axially bent to bias the pressure plate 16 toward the second axial side. A head of each bolt 42 is arranged correspondingly to the foregoing recess in the clutch cover 15.

The pushing mechanism 17 is employed for applying a pushing or urging force on the pressure plate 16 for clutch engagement. The pushing mechanism 17 includes a diaphragm spring 44, a plurality of lever members 45 and a retainer 46.

The retainer 46 is an annular member that is arranged close to the outer periphery of the input shaft 3. The retainer 46 has an annular groove 46a formed at its outer peripheral surface and a radially inner flange 46b formed at its inner peripheral surface.

The lever members 45 are formed of a plurality of radial plate members, which are circumferentially spaced from each other around the first axial side of the retainer 46. Each lever member 45 has a radially inner end engaged with the retainer 46, and a radially outer end engaged with the pressure plate 16 and the fulcrum ring 60. The lever members 45 can be replaced with a single annular plate. The radially inner ends of the lever members 45 are fitted into a groove 46a of the retainer 46. The first axial sides of the radially inner ends of the lever members 45 form a radially curved convex surface, which is in swingable contact with the first axial side surface of the groove 46a. The radially outer portions of the lever members 45 are arranged axially between the pressure plate 16 and the clutch cover 15 (and particularly, the accommodating portion 29). The second axial side surfaces of the radially outer portions of the lever members 45 are supported by the fulcrum ring 60. The first axial side surfaces of the portions of the lever members 45, which are located radially inside the foregoing support portion, are supported by the support portion 39 of the pressure plate 16.

The diaphragm spring 44 is axially spaced from the second axial sides of the lever members 45. The second axial side surface of the outer peripheral surface of the diaphragm spring 44 is supported by the annular projection 30 of the clutch cover 15 (and particularly, in the accommodating portion 29). The radially inner end of the diaphragm spring 44 is in contact with the second axial side surface of the retainer 46. In this state, the diaphragm spring 44 biases the radially inner ends of the lever members 45 toward the first axial side via the retainer 46.

The radially inner end of the diaphragm spring 44 is engaged with the rod-like members 28 for preventing rotation. The retainer 46 is provided with apertures fitted with the respective rod-like members 28 so that the rod-like members 28 can guide the retainer 46 for axial movement.

Each lever member 45 has a force receiving point 50 at its radially inner position for receiving a power directed toward the first axial side from the retainer 46, a force application point 51 at its radially middle position for applying the force to the pressure plate 16, and a fulcrum point 52 at its radially outer position to be supported by the clutch cover 15. Each of the points 50, 51 and 52 is actually a linear portion having an arc-shaped or annular form extending around the central rotation axis O—O. The force application point 51 is defined by a portion of each lever member 45 projected toward the first axial side. The force application point 51 is in contact with the support portion 39 of the pressure plate 16. The fulcrum point 52 is defined by a portion of each lever member 45 projected toward the second axial side. The fulcrum point 52 is in contact with the annular support portion 40 formed on the first axial side surface of the fulcrum ring 60. The portion forming the fulcrum point 52 is provided with a plurality of circumferentially spaced apertures 52a, into which the projections 40a extending from the support portion 40 of the fulcrum ring 60 are fitted, respectively. As a result, the lever members 45 rotate together with the clutch cover 15. It is assumed that the radial distance from the force receiving point 50 to the fulcrum point 52 is equal to L1, the radial distance from the force receiving point 50 to the force applying point 51 is equal to L2, and the radial distance from the point 51 to the fulcrum point 52 is equal to L3. Thereby, the pushing load transmitted from the diaphragm spring 44 to the lever members 45 is increased by L2/L3 times for transmission to the pressure plate 16.

The wear compensating mechanism 18 will now be described. The wear compensating mechanism 18, which is shown in FIG. 3 in greater detail, has the purpose of restoring the axial position or height of the force receiving point 50 (i.e., the radially inner end of each lever member 45) to the initial position or height after the friction facings 4a of the clutch disk assemblies 4 are worn. In other words, the wear compensation mechanism 18 has the purpose of keeping a release bearing 84 at a constant axial position, and thereby keeping a constant clutch-brake gap. For this purpose, the wear compensating mechanism 18 is configured to move the fulcrum point 52 on the clutch cover side of the lever members 45 toward the friction facings 4a by an amount corresponding to the wear in the next clutch releasing operation when the wear occurs on the friction facings 4a of the clutch disk assemblies 4.

The wear compensating mechanism 18 is primarily formed of the biasing mechanism 55 and a wear amount detecting mechanism 56. The biasing mechanism 55 is a mechanism for biasing the fulcrum ring 60, which will be described later in greater detail, toward the first axial side and therefore toward the clutch disk assemblies 4. The wear amount detecting mechanism 56 is a restricting mechanism that restricts movement of the adjustment ring 59 of the biasing mechanism 55 toward the first axial side, and thus allowing movement of the adjustment ring 59 toward the first axial side by an amount corresponding to the amount of wear in the release operation subsequent to occurrence of the wear in the clutch disk assemblies 4.

As seen in FIG. 3, the biasing mechanism 55 is disposed within the accommodating portion 29 of the clutch cover 15. The biasing mechanism 55 is primarily formed of a ring member 58 fixedly coupled to the clutch cover 15, the adjustment ring 59, the fulcrum ring 60 and a biasing member formed of a plurality of adjustment springs 61.

As shown in FIGS. 1 and 5, the ring member 58 is an annular member, which is non-rotatably fixed to the bottom of the annular portion 26 of the clutch cover 15. More specifically, the ring member 58 is provided on its second axial side with a plurality of projections 58a. The projections 58a are fitted into concave portions formed in the annular portion 26, respectively, so that the ring member 58 can rotate together with the clutch cover 15. The ring member 58 has an outer peripheral surface supported on the inner peripheral surface of the cylindrical portion 23, and an inner peripheral surface supported by the outer peripheral surface of the annular projection 30. The ring member 58 is provided at its first axial side surface with a plurality of inclined surfaces 58b. Each inclined surface 58b extends in a circumferential direction, and is inclined to increase its axial size or height as the position moves in the rotating direction R1.

The adjustment ring 59 (first ring member) is disposed on the first axial side with respect to the ring member 58. The fulcrum ring 60 (second ring member) is disposed on the first axial side with respect to the adjustment ring 59. These members or rings 59 and 60 are in axial contact with each other. The bottom surface (first axial side surface of the annular portion 26) of the groove 32 in the clutch cover 15, the second axial side surface of the ring member 58, the first axial side surface of the adjustment ring 59 and the second axial side surface of the fulcrum ring 60 are perpendicular to the rotation axis O—O of the clutch device 1.

The adjustment ring 59 is in contact with the first axial side of the ring member 58. The adjustment ring 59 has the outer peripheral surface supported on the inner peripheral surface of the cylindrical portion 23. The adjustment ring 59 is provided at its second axial side surface with a plurality of first inclined surfaces 59a corresponding to the inclined surfaces 58b, respectively. Each of the first inclined surfaces 59a is in complementary contact with the corresponding inclined surface 58b. More specifically, the inclined surfaces 58b of the ring member 58 and the first inclined surfaces 59a of the adjustment ring 59 form a first wedge mechanism.

The adjustment springs 61 are disposed in an annular space or a plurality of arc-shaped spaces located between the ring member 58 and the adjustment ring 59. The adjustment springs 61 are employed for biasing the adjustment ring 59 in the rotating direction R1 with respect to the ring member 58. The adjustment springs 61 can be either tension springs and/or compression springs. Of course, a single adjustment spring 61 can be used if needed and/or desired. Owing to the biasing by the adjustment springs 61, a force is applied from the inclined surfaces 58b of the ring member 58 to the first inclined surfaces 59a of the adjustment ring 59, and the axial component of this force always biases the adjustment ring 59 toward the first axial side.

Referring to FIGS. 4–7, the first axial side surface of the adjustment ring 59 has an annular flat portion located radially inside of substantially a plurality of second inclined surfaces 59b. Each second inclined surface 59b is formed by an axially concave portion on the radially outer portion. Each inclined surface 59b extends in a circumferential direction, and is inclined such the axial height gradually increase as the position moves in the rotating direction R1.

The inclination angles $\theta_1$ of the first inclined surfaces 59a are larger than the inclination angles $\theta_2$ of the second inclined surfaces 59b, and a ratio $\theta_1/\theta_2$ between them is equal to a value obtained by multiplying the ratio L1/L2 of the lever members 45 by r1/r2, where r1 is an average radius of the first inclined surfaces 59a, and r2 is an average radius of the second inclined surfaces 59b as measured from the rotation axis O—O. The inclination angle is an angle defined with respect to a plane normal to the rotation axis O—O of the clutch device 1 (see FIG. 5).

The fulcrum ring 60 is supported on the inner peripheral surface of the cylindrical portion 23 of the clutch cover 15. The fulcrum ring 60 is nonrotatable and axially movable with respect to the clutch cover 15 via the grooves and projections engaged together. In this embodiment, the wear detecting mechanism 56 is formed of, e.g., two mechanisms, which are arranged in the diametrically opposite positions, respectively, and each of the wear detecting mechanisms includes a roll pin 73, a nut 74 and a bolt 75.

Each roll pin 73 is fitted into one of the axial apertures 24a formed in the flat portion 24 of the clutch cover 15. Each roll pin 73 is formed of a cylindrical spring member provided with an axial slit, which elastically contacts the surface of the corresponding axial aperture 24a. As described above, the roll pins 73 are frictionally engaged with the apertures 24a of the clutch cover 15 such that they do not axially move until a force of a predetermined magnitude is applied thereto. In the clutch engaged state shown in FIG. 3, the end surface on the first axial side of the roll pin 73 does not protrude beyond the end surface on the first axial side of the flat portion 24 of the clutch cover 15. The axial space between this end surface on the first axial side and the end surface on the second axial side of the pressure plate 16 defines an amount (i.e., a release stroke of the pressure plate), which the pressure plate 16 can move toward the second axial side in the clutch releasing operation.

The apertures 24a are formed corresponding to the cylindrical portion 23, and the corresponding portions of the cylindrical portion 23 are radially penetrated.

The corresponding nuts 74 are fitted into the corresponding roll pins 73. Each nut 74 is provided on its first axial side with a screw hole 74a and a flange 74b on its second axial side. The flange 74b contacts the second axial side surface of the roll pin 73. The end on the first axial side of the nut 74 is shifted toward the second axial side with respect to the first axial side of the roll pin 73. In this embodiment, the nut 74 is fitted into the roll pin 73, and does not axially move away from the roll pin 73. The nut 74 and the roll pin 73 can be fixed by a manner other than the above pressure fitting.

A threaded portion 77 of the bolt 75 is engaged with the screw hole 74a of the nut 74. A head 78 of the bolt 75 is arranged within an axial aperture 79 in the pressure plate 16. The axial aperture 79 in the pressure plate 16 is located in the position corresponding to the axial aperture 24 of the clutch cover 15. The axial aperture 79 is formed of a first aperture 80 opened at the pushing surface 37 and a second aperture 81, which continues to the first aperture 80 and is opened at the second axial side surface. The second aperture 81 is coaxial with the first aperture 80, but has a smaller diameter than the first aperture 80. The head 78 of the bolt 75 is in contact with the bottom surface of the first apertures 80.

Owing to the above structure, the bolt 75, the nut 74 and the roll pin 73 form an axially movable single member (wear amount detecting member), which can move from the position shown in FIG. 3 toward the pressure plate 16, but cannot move away from the pressure plate 16. Thereby, the pressure plate 16 receives a resistance force from the bolt 75 when it moves toward the second axial side from the position shown in FIG. 3, but can freely move toward the first axial side until it comes into contact with the roll pin 73. A bolt cap 83 is engaged with the side near the pushing surface 37 of the first aperture 80 for preventing the bolt 75 from falling out of aperture 79.

The flange 74b of each nut 74 is provided with an engagement portion 74c, which extends radially inward. The engagement portion 74c is fitted into the concavity formed at the outer peripheral surface of the adjustment ring 59. The surface on the second axial side of each engagement portion 74c forms an inclined surface 74d, which is inclined in the rotating direction, and is in complementary contact with one of the second inclined surfaces 59b of the adjustment ring 59. In this manner, the second inclined surfaces 59b and the inclined surfaces 74d form a second wedge mechanism. When the nuts 74 and the roll pins 73 receive an axial force from the adjustment ring 59, of which second inclined surfaces 59b are in contact with the inclined surfaces 74d, the roll pins 73 receive a resistance force from the apertures 24a in the clutch cover 15. In other words, the nuts 74 and the roll pins 73 are axially movably and frictionally engaged with the clutch cover 15, and functions as a movement stop mechanism for supporting the load of the biasing mechanism 55. The configurations, structures, arrangements and others of the members of the movement stop mechanism are not restricted, provided that the above function can be achieved. Further another member may be added to the above structures for forming the stop mechanism.

In summary, the wear amount detecting mechanism 56 described above is not a mechanism for stopping axial movement of the pressure plate with respect to the clutch cover in contrast to the prior art, but is a mechanism for stopping the biasing mechanism 55 which directly drives the fulcrum ring 60. More specifically, the wear amount detecting mechanism 56 stops the operation of the biasing mechanism 55 by stopping rotation of the adjustment ring 59 applying an axial force to the fulcrum ring 60. The wear amount detecting mechanism 56 cooperates with the adjustment ring 59 to form the second wedge mechanism, and thereby operates to inhibit and allow the rotation of the adjustment ring 59. The wear amount detecting mechanism 56 cooperates with the biasing mechanism 55 to form therebetween the space, in which the biasing mechanism 55 can operate. This space depends on only the positional relationship between the biasing mechanism 55 and the wear amount detecting mechanism 56, both of which are supported by the clutch cover 15. Thus, the above space (i.e., an amount allowing movement of the fulcrum ring 60) is not affected by the position and movement of the pressure plate 16 as well as the size of the space between the fulcrum ring 60 and the lever members 45.

The release device 6 shown in FIG. 1 is a device for releasing the clutch device 1 by pulling the ends of the lever members 45 toward the second axial side, and is primarily formed of a sleeve 82 and a release bearing 84. The sleeve 82 is a cylindrical member arranged around the transmission input shaft 3. The radially outer flange 82a formed on the first axial end of the sleeve 82 is in contact with the first axial side of the inner peripheral surface of the inner flange 46b of the retainer 46.

The release bearing 84 is arranged around the second axial end of the sleeve 82. The inner race 84a of the release bearing 84 is fixed to the sleeve 82. An outer peripheral wall 85 is fixed to an outer race 84b of the release bearing 84. The outer peripheral wall 85 is provided at diametrically opposite two positions with engagement portions 86, respectively. A release fork 87 is swingably supported by support means (not shown) attached to a clutch housing (not shown), and is coupled to a clutch operating mechanism (not shown). An end of the release fork 87 is opposed to the first axial sides of the engagement portions 86 of the outer peripheral wall 85 with a predetermined space therebetween.

A coil spring 88 is arranged axially between the inner race 84a of the release bearing 84 and the radially inner portion of the retainer 46. The coil spring 88 biases the retainer 46 against the sleeve 82. The retainer 46 thus biased toward the first axial side is pushed against the sleeve 82 so that the inner flange 46b and the outer flange 82a are not axially spaced from each other. As a result, the sleeve 82 and the inner race 84a can rotate together with the clutch cover 15.

Further, a clutch brake 7 is arranged on the wall surface of the transmission housing (not shown). A predetermined axial space (clutch brake gap) is kept between the clutch brake 7 and the release bearing 84. The clutch brake 7 is a mechanism for achieving smooth shifting of the transmission. More specifically, the clutch brake 7 is held between the release device 6, which is in the end position on the second axial side within the movable range, and the wall of the transmission housing, and thereby functions to stop the rotation of the transmission input shaft 3. The clutch brake gap is equal to a value obtained by multiplying the release stroke of the pressure plate 16 by the leverage of the lever members 45. The state in which the release bearing 84 is in contact with the clutch brake 7 is referred to as a "maximum release state".

Operation of First Embodiment

In the clutch engaged state shown in FIG. 1, the lever members 45 apply a pushing force to the pressure plate 16. Further, strap plates 41 apply the biasing force to the pressure plate 16 to move it away from the clutch disk assemblies 4. More specifically, a force obtained by subtracting the biasing force from the pushing force is applied from the pressure plate 16 to the clutch disk assemblies 4. In this state, the fulcrum ring 60 and the roll pins 73 do not move axially.

Figure 6:
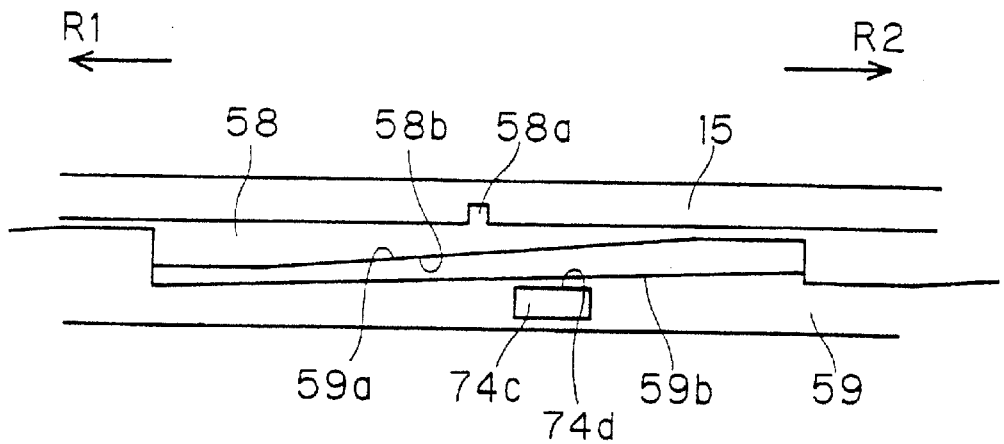
FIG. 6 is an enlarged partial schematic view of the wedge mechanism formed with two kinds of inclined surfaces used in the wear compensating mechanism of the clutch cover assembly shown in FIGS. 1–3.
Figure 7:
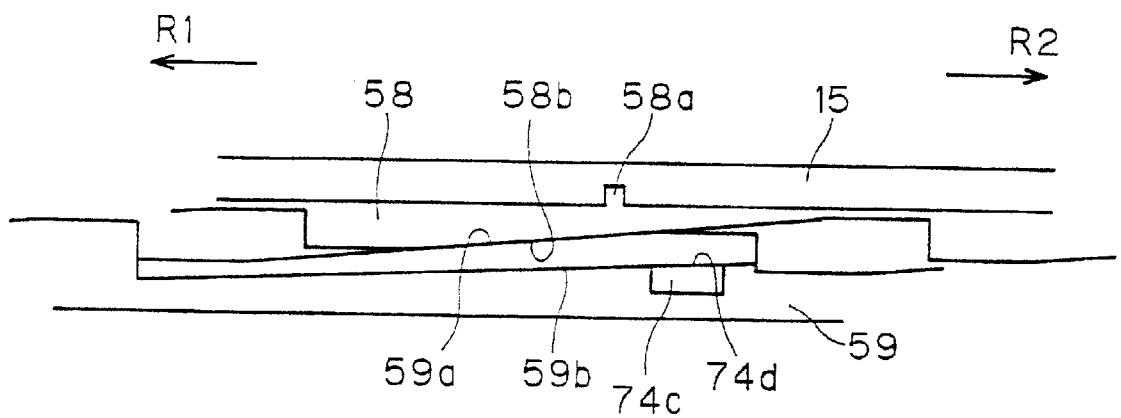
FIG. 7 is an enlarged partial schematic view of the wedge mechanism formed of two kinds of inclined surfaces used in the wear compensating mechanism of the clutch cover assembly shown in FIGS. 1–3.

Description will now be given on a wear compensating operation in the clutch cover assembly 5, which is performed when wear occurs in the clutch disk assemblies 4. When the wear occurs in the clutch disk assemblies 4, which were in the state shown in FIG. 1, the pressure plate 16 moves toward the friction surface 11 in accordance with the wear. In this operation, the pressure plate 16 acts on each bolt 75 to move the corresponding nut 74 and roll pin 73 with respect to the clutch cover 15 toward the flywheel 2 by an amount equal to the wear amount. More specifically, the structures are configured such that the force acting on the pressure plate 16 toward the flywheel is larger than the static friction force acting on the roll pins 73 from the clutch cover 15. Consequently, as shown in FIG. 6, the engagement portion 74c of each nut 74 is axially spaced from the second inclined surfaces 59b of the adjustment ring 59 by an amount equal to the wear amount.

Then, the clutch release operation is performed. When an operator depresses a clutch pedal, a clutch operating mechanism operates the release fork 87 to move the release device 6 toward the second axial side. More specifically, the ends of the release fork 87 come into contact with the engagement portions 86 on the outer peripheral wall 85, and move the entire release device 6 toward the second axial side. Thereby, the release device 6 moves the radially inner ends of the diaphragm spring 44 and lever members 45 toward the second axial side via the retainer 46. As a result, the pushing force applied from the lever members 45 to the pressure plate 16 is released, and the pressure plate 16 biased by the strap plates 41 moves toward the second axial side.

In the clutch released state, the adjustment ring 59 rotates in the rotating direction R1 to move the fulcrum ring 60 toward the first axial side. This is allowed owing to such setting that the axial component of the force acting on the adjustment ring 59 from the ring member 58 is larger than the biasing force of the strap plates 41. As a result, the support portions 40 of the lever members 45 and the pressure plate 16 move toward the first axial side.

As shown in FIG. 5, when the second inclined surfaces 59b of the adjustment ring 59 comes into contact with the inclined surfaces 74d of the nuts 74, the periphery of the apertures 24a in the clutch cover 15 applies a resistance force to the roll pins 73 so that the rotation of the adjustment ring 59 stops. Thus, the fulcrum ring 60 no longer moves axially.

In the foregoing operation, the fulcrum ring 60 and the adjustment ring 59 axially move a distance S. The distance S is larger than a wear amount W, and is equal to a product of the wear amount W and the ratio $\theta_1/\theta_2$ ($=(L1/L2) \times (r1/r2)$). In this manner, the height of the end (radially inner end) of each lever member 45 can be kept constant. If the moved distance of the fulcrum ring 60 were equal to the wear amount W, an axial space would occur between the support member and the fulcrum of the lever member after compensation of the wear so that the fulcrum would move toward the clutch cover in the next clutch engaged state, and therefore the attitude or inclination of the lever member would change. Thus, the end (radially inner end) of the lever member would move toward the flywheel.

Owing to the wear compensating operation described above, the axial position of the fulcrum points 52 of the lever members 45 are shifted toward the first axial side in accordance with the wear amount of the friction facings 4a. As a result, the fulcrum points 52 and the force applying points 51 of the lever members 45 are shifted in the first axial direction in accordance with the wear amount, and therefore the axial position of the force receiving points 50 are constant although the attitude of the lever members 45 are changed. Accordingly, the attitude of the diaphragm spring 44 does not change, and the axial positions of the retainer 46, sleeve 82 and release bearing 84 do not change. Thus, the axial space between the end of the release fork 87 and the engagement portion 86 of the release device 6 as well as the clutch brake gap do not change.

In this first embodiment, the relationship between the first and second inclined surfaces 59a and 59b of the adjustment ring 59 is appropriately set so that the wear adjustment can be performed in expectation of the wear amount of each of the fulcrum portions of the lever members and the diaphragm spring.

Modifications of First Embodiment

The invention is not restricted to the clutch device 1 of the first embodiment of the present invention. The present invention can be employed in various devices such as a clutch device including only one clutch disk assembly, a clutch device which includes a pushing member formed of only a diaphragm spring or the like, a clutch device which includes pushing members formed of a lever member and independent springs, and a clutch device which is configured to release the clutch by pushing the pushing member toward the flywheel. The provision of the clutch brake is not essential. In the clutch cover assembly according to the present invention, the axial space, in which the first ring member can move, is formed between the detecting mechanism and the first ring member so that the amount of axial movement of the fulcrum of the pushing member can be precisely kept at an intended value.

Second Embodiment

Referring now to FIGS. 8–12, a clutch device 100 is illustrated in accordance with a second embodiment of the present invention. The clutch device 100 is employed in a vehicle, and particularly a large vehicle such as a truck. The clutch device 100 is a device for transmitting a torque from a flywheel 2 of an engine to an input shaft 3 of a transmission, and for intercepting such torque transmission when necessary. In view of the similarity between the first and second embodiments, the parts of the clutch device 100 of the second embodiment that are identical to the parts of the first embodiment will be given the same reference numerals as the parts of the first embodiment. Moreover, the description of the parts of the clutch device 100 of the second embodiment that are identical to the parts of the first embodiment may be omitted. The parts of the clutch device 100 of the second embodiment that differ from the parts of the first embodiment will be indicated with a prime (').

Figure 8:
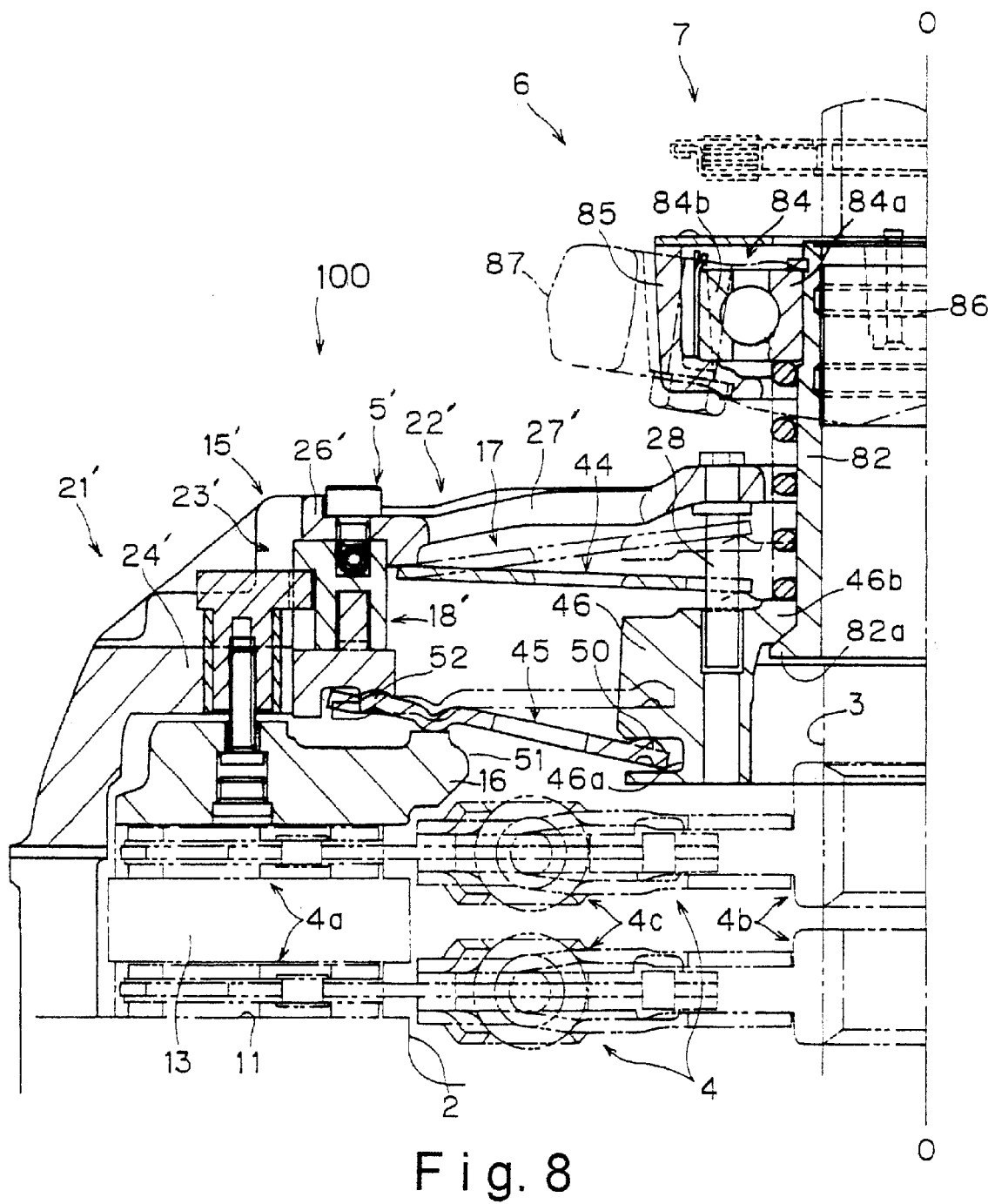
FIG. 8 is a partial schematic cross sectional view of a clutch device employing a clutch cover assembly of a second embodiment of the present invention in a clutch engaged state before wear has occurred.
Figure 9:
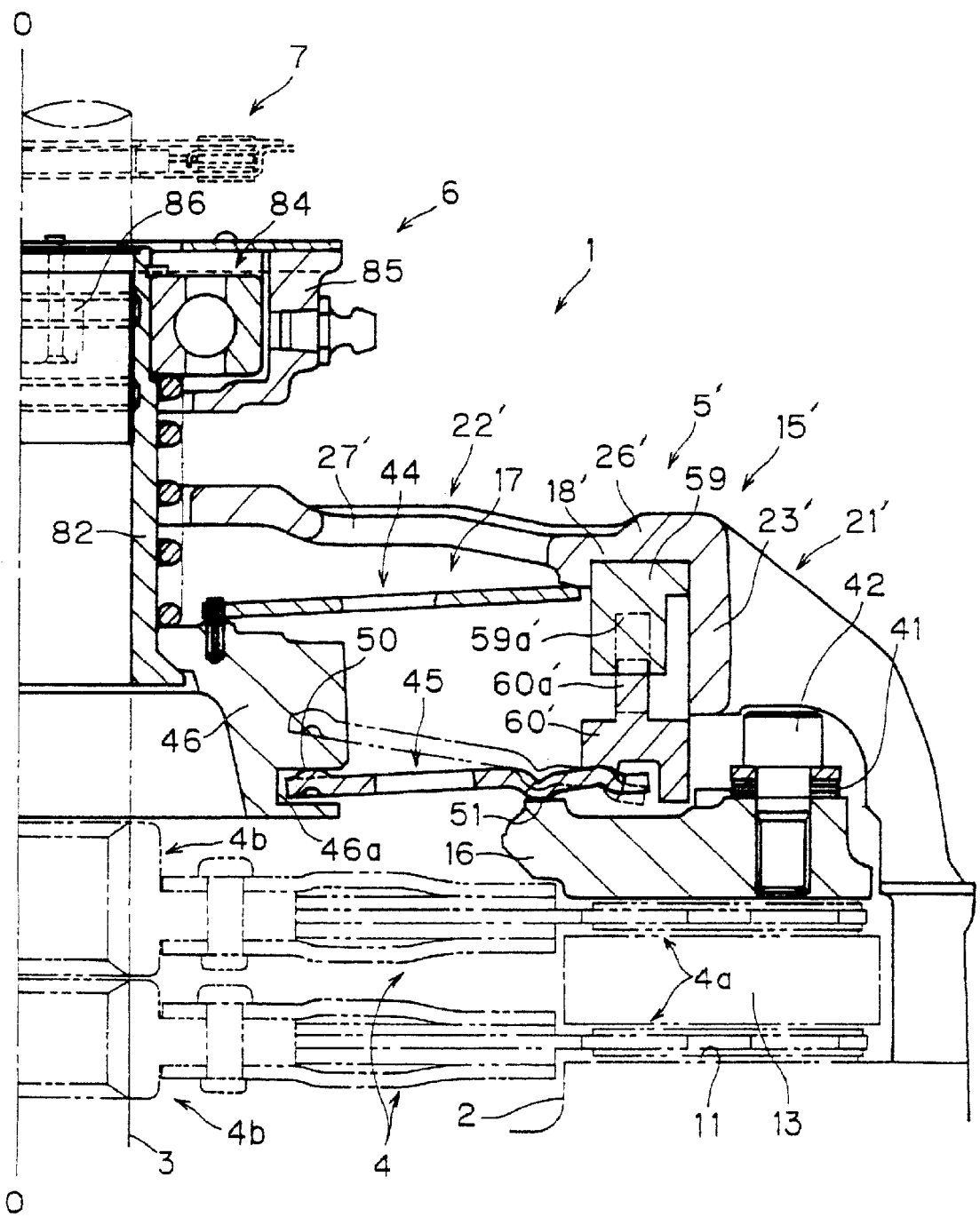
FIG. 9 is a partial schematic cross sectional view of the clutch device employing the clutch cover assembly of the second embodiment of the present invention illustrated in FIG. 8 in the clutch engaged state after wear has occurred.
Figure 11:
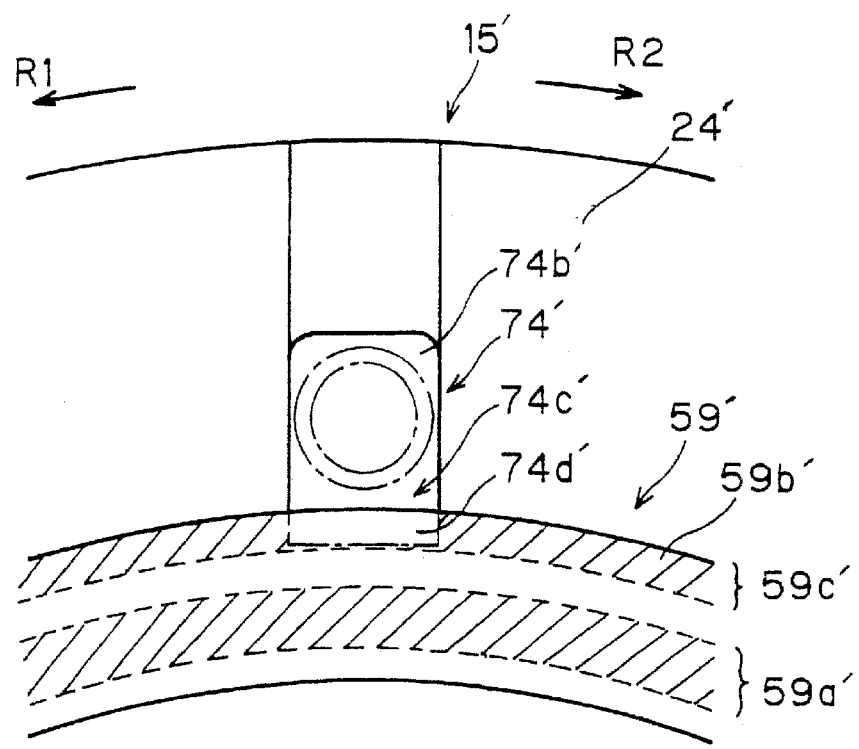
FIG. 11 is an enlarged partial elevational view of a portion of the clutch cover of the clutch cover assembly of the second embodiment of the present invention illustrated in FIGS. 8–10.
Figure 12:
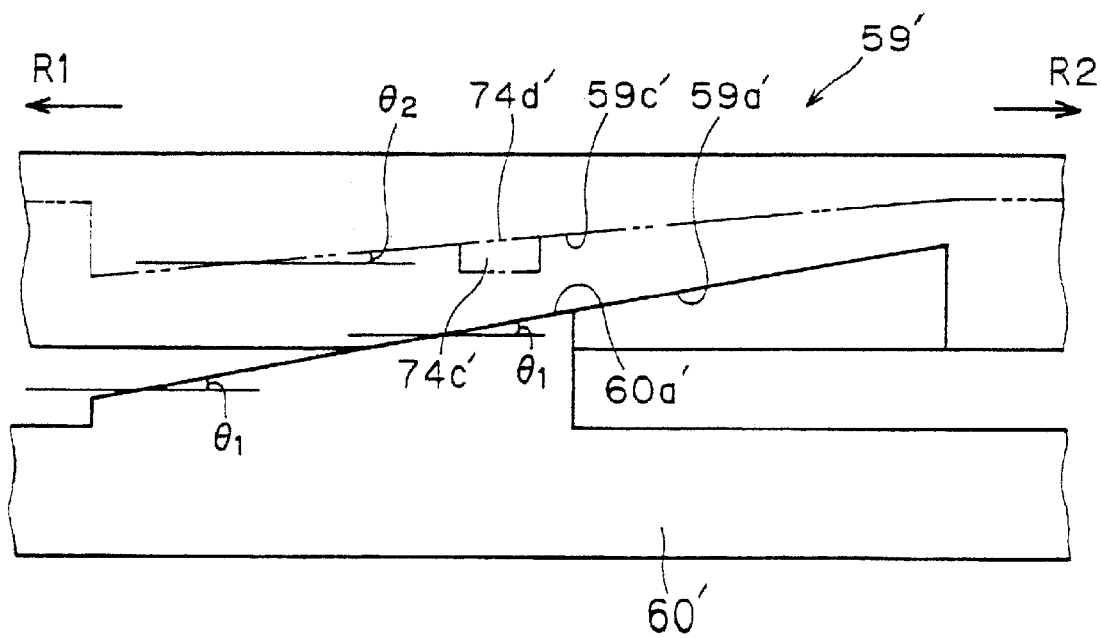
FIG. 12 is an enlarged partial schematic view of a wedge mechanism formed with two kinds of inclined surfaces used in the wear compensating mechanism of the clutch cover assembly of the second embodiment of the present invention illustrated in FIGS. 8–11.

The clutch device 100 is primarily formed of a pair of clutch disk assemblies 4, a clutch cover assembly 5' and a release device 6. As seen in FIGS. 8 and 9, center line O—O indicates a rotation axis of the clutch device 100. The lower side in FIG. 8 will be referred to herein as a first axial side (engine side), while the upper side in FIG. 8 will be referred to herein as a second axial side (transmission side). In FIGS. 11 and 12, a direction R1 indicated by arrows is a rotating direction of the clutch device 100, and a direction R2 indicated by arrows is a reverse direction of the clutch device 100. When the clutch device 100 is engaged before wear occurs in the clutch disk assemblies 4, the various members of the clutch device 100 take the positions and attitudes shown in FIG. 8. When the clutch device 100 is engaged and wear has occurred in the clutch disk assemblies 4 to a certain extent, the various members of the clutch device 100 take the positions and attitudes shown in FIG. 9. The transmission provided with the clutch device 100 is of a type not having a synchronous mechanism or synchronizer, and therefore, the clutch device 100 is provided with a clutch brake 7, which will be described later.

The flywheel 2 is a circular disk-shaped member that is attached to an end of a crank shaft (not shown) of the engine. The flywheel 2 is provided with an annular flat frictional surface 11 at the second axial side of the radially outer portion.

The clutch disk assemblies 4 are disposed close to the second axial side of the flywheel 2. The clutch disk assemblies 4 are configured to be coupled to the flywheel 2 for transmitting the torque of the engine to the transmission input shaft 3. Preferably two clutch disk assemblies 4 are employed in this clutch device 100, with each having a pair of friction facings 4a (friction members) arranged at its radially outer portion, a hub 4b coupled to the transmission input shaft 3, and a damper mechanism 4c elastically coupling the friction facings 4a to the hub 4b in the rotating direction. One of the friction facings 4a of one of the clutch disk assemblies 4 is disposed close to the friction surface 11 of the flywheel 2. One of the friction facings 4a of the other clutch disk assembly 4 is remote from the friction surface 11 of the flywheel 2, and is located on the second axial side with respect to the flywheel 2 so as to engage pressure plate 16. An intermediate plate 13 is disposed axially between the adjacent friction facings 4a of the two clutch disk assemblies 4. The intermediate plate 13 is nonrotatable but is axially movable with respect to the clutch cover 15', which will be described later.

The clutch cover assembly 5' is a device for transmitting and interrupting the torque of the flywheel 2 via the clutch disk assemblies 4. The clutch cover assembly 5' is attached to the flywheel 2. As shown in FIG. 3, the clutch cover assembly 5' basically includes the clutch cover 15', a pressure plate 16, a pushing mechanism 17 and a wear compensating mechanism 18'.

The clutch cover 15' is an annular member fixedly coupled to the flywheel 2. More specifically, the radially outer portion of the clutch cover 15' is fixedly coupled to the flywheel 2 by bolts. The clutch cover 15' covers the outer periphery of the clutch disk assemblies 4. The clutch cover 15' is located on the second axial side of the clutch disk assemblies 4. In this manner, the clutch cover 15' is axially opposed to the friction surface 11 of the flywheel 2.

The clutch cover 15 basically includes a radially outer covering portion 21', a disk-shaped portion 22' and a cylindrical portion 23' formed between these portions 21' and 22'. The radially outer covering portion 21' has a substantially cylindrical form for covering the outer periphery of the pressure plate 16, and has a radially outer end fixed to the flywheel 2 by bolts (not shown) in a conventional manner. The radially outer covering portion 21' has recesses at several portions to form radially outward openings. Referring to FIG. 3, the radially outer covering portion 21' is provided with a plurality of flat portions 24' located radially outside the cylindrical portion 23'. The flat portions 24' are continuous to the end on the first axial side of the cylindrical portion 23'. The flat portions 24' are axially opposed to a surface 38, on the second axial side, of the radially inner portion of the pressure plate 16 with a space therebetween.

The disk-shaped portion 22' extends radially inward from the end, on the second axial side, of the radially outer covering portion 21'. The disk-shaped portion 22' has the inner periphery neighboring to the outer periphery of the input shaft 3. The disk-shaped portion 22' is provided at its radially middle portion with a plurality of circumferentially spaced apertures 27', and also has an annular portion 26', which forms the radially outer portion of the disk-shaped portion 22'. The annular portion 26' is located radially and immediately inside the cylindrical portion 23'. Rod-like members 28 are fixedly coupled to the portion of the disk-shaped member 22' near its inner periphery. Each rod-like member 28 extends from the radially inner end of the clutch cover 15' toward the first axial side.

Figure 10:
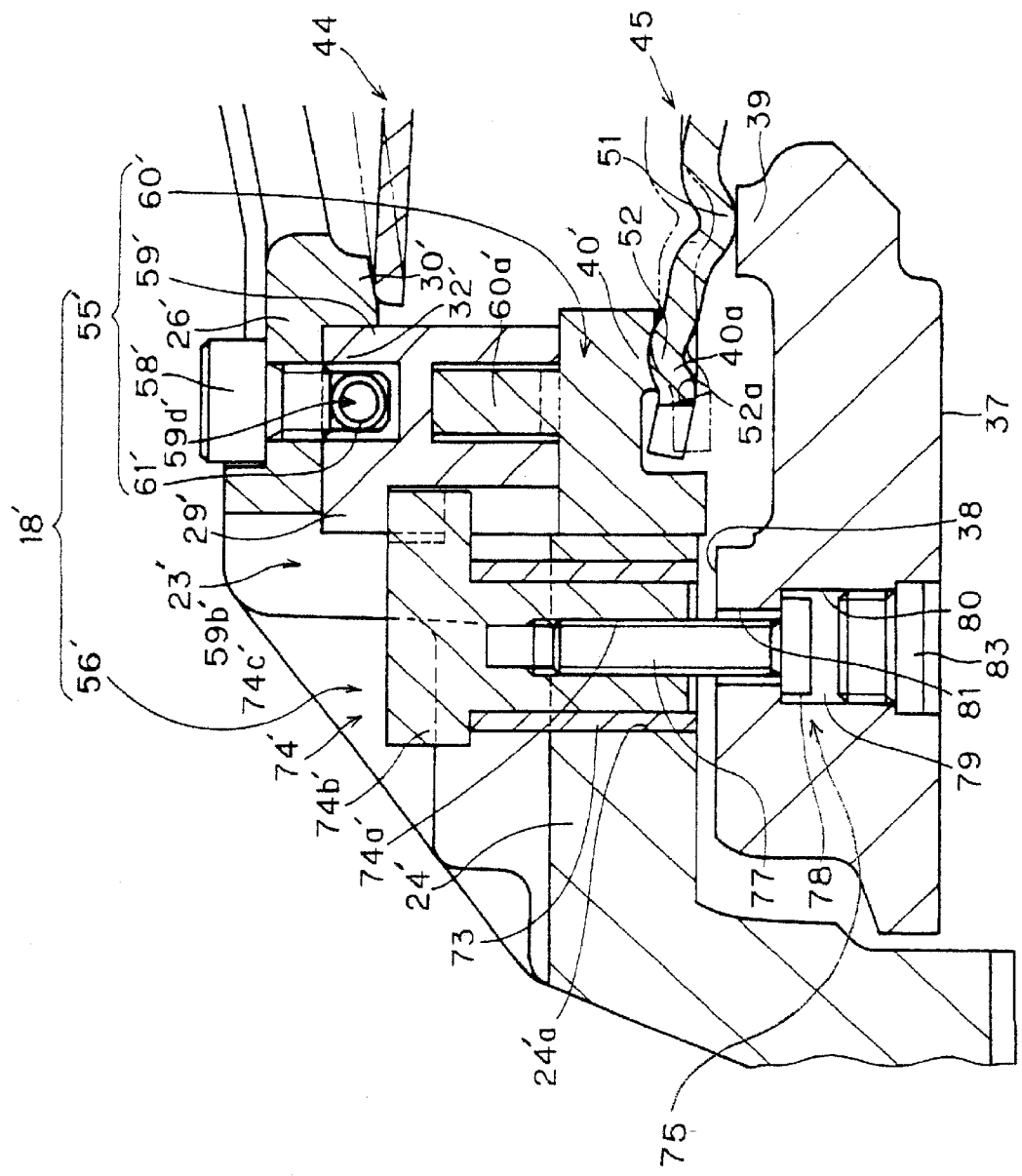
FIG. 10 is an enlarged partial schematic cross sectional view of a wear compensating mechanism of the clutch cover assembly of the second embodiment of the present invention illustrated in FIGS. 8 and 9.

As shown in FIG. 10, an accommodating portion 29' is formed in a position radially inside the cylindrical portion 23' of the clutch cover 15' for accommodating a biasing mechanism 55' of the wear compensating mechanism 18', which will be described later. Thus, the accommodating portion 29' is located on the first axial side of the annular portion 26'. The annular portion 26' is provided at its inner periphery with an annular projection 30' projecting in the first axial direction. An annular groove 32' is defined between the cylindrical portion 23' and the annular projection 30'.

The pressure plate 16 is an annular member, which is located radially inside the clutch cover 15' and axially between the clutch cover 15' and the friction facing 4a of the clutch disk assembly 4 on the second axial side of the intermediate member 13. The surface on the first axial side of the pressure plate 16 forms an annular, flat pushing surface 37. The pressure plate 16 is provided at its second axial side with a second axial side surface 38, which is opposed to the clutch cover 15'. Further, an annular support portion 39 is formed radially inside the second axial side surface 38. The support portion 39 projects toward the second axial side beyond the other portions.

The pressure plate 16 is coupled to the clutch cover 15' by a plurality of strap plates 41 as shown in FIG. 9. More specifically, the strap plates 41 are circumferentially and equally spaced around the clutch cover 15'. Each strap plate 41 is fixed at one of its ends on the R2 side to the radially outer portion of the pressure plate 16 by a bolt 42, and is also fixed at the other of its ends on the R1 side by a bolt (not shown) to the clutch cover 15'. Owing to this coupling arrangement, the pressure plate 16 can rotate in the R1 direction together with the clutch cover 15'. In the clutch engaged state, the strap plates 41 are axially bent to bias the pressure plate 16 toward the second axial side. A head of each bolt 42 is arranged correspondingly to the foregoing recess in the clutch cover 15'.

The pushing mechanism 17 is employed for applying a pushing or urging force on the pressure plate 16 for clutch engagement. The pushing mechanism 17 includes a diaphragm spring 44, a plurality of lever members 45 and a retainer 46.

The retainer 46 is an annular member that is arranged close to the outer periphery of the input shaft 3. The retainer 46 has annular groove 46a formed at its outer peripheral surface and radially inner flange 46b formed at its inner peripheral surface.

The lever members 45 are preferably formed of a plurality of radial plate members, which are circumferentially spaced from each other around the first axial side of the retainer 46. Each lever member 45 has a radially inner end engaged with the retainer 46, and a radially outer end engaged with the pressure plate 16 and the fulcrum ring 60'. The lever members 45 can be replaced with a single annular plate. The radially inner ends of the lever members 45 are fitted into a groove 46a of the retainer 46. The first axial sides of the radially inner ends of the lever members 45 form a radially curved convex surface, which is in swingable contact with the first axial side surface of the groove 46a. The radially outer portions of the lever members 45 are arranged axially between the pressure plate 16 and the clutch cover 15' (and particularly, the accommodating portion 29'). The second axial side surfaces of the radially outer portions of the lever members 45 are supported by the fulcrum ring 60'. The first axial side surfaces of the portion of the lever members 45, which are located radially inside the foregoing support portion, are supported by the support portion 39 of the pressure plate 16.

The diaphragm spring 44 is axially spaced from the second axial sides of the lever members 45. The second axial side surface of the outer peripheral surface of the diaphragm spring 44 is supported by the annular projection 30' of the clutch cover 15' (and particularly, in the accommodating portion 29'). The radially inner end of the diaphragm spring 44 is in contact with the second axial side surface of the retainer 46. In this state, the diaphragm spring 44 biases the radially inner ends of the lever members 45 toward the first axial side via the retainer 46.

The radially inner end of the diaphragm spring 44 is engaged with the rod-like members 28 for preventing rotation. The retainer 46 is provided with apertures fitted with the respective rod-like members 28 so that the rod-like members 28 can guide the retainer 46 for axial movement.

Each lever member 45 has a force receiving point 50 at its radially inner position for receiving a power directed toward the first axial side from the retainer 46, a force application point 51 at its radially middle position for applying the force to the pressure plate 16, and a fulcrum point 52 at its radially outer position to be supported by the clutch cover 15'. Each of the points 50, 51 and 52 is actually a linear portion having an arc-shaped or annular form extending around the central rotation axis O—O. The force application point 51 is defined by a portion of each lever member 45 projected toward the first axial side. The force application point 51 is in contact with the support portion 39 of the pressure plate 16. The fulcrum point 52 is defined by a portion of each lever member 45 projected toward the second axial side. The fulcrum point 52 is in contact with the annular support portion 40' formed on the first axial side surface of the fulcrum ring 60'. The portion forming the fulcrum point 52 has a plurality of circumferentially spaced apertures 52a, into which the projections 40a extending from the support portion 40' of the fulcrum ring 60' are fitted, respectively. As a result, the lever members 45 rotate together with the clutch cover 15'. It is assumed that the radial distance from the force receiving point 50 to the fulcrum point 52 is equal to L1, the radial distance from the force receiving point 50 to the force applying point 51 is equal to L2, and the radial distance from the point 51 to the fulcrum point 52 is equal to L3. Thereby, the pushing load transmitted from the diaphragm spring 44 to the lever members 45 is increased by L2/L3 times for transmission to the pressure plate 16.

The wear compensating mechanism 18' will now be described. The wear compensating mechanism 18', which is shown in FIG. 10 in greater detail, has the purpose of restoring the axial position or height of the force receiving point 50 (i.e., the radially inner end of each lever member 45) to the initial position or height after the friction facings 4a of the clutch disk assemblies 4 are worn. In other words, the wear compensating mechanism 18 has the purpose of keeping a release bearing 84 at a constant axial position, and thereby keeping a constant clutch-brake gap. For this purpose, the wear compensating mechanism 18' is configured to move the fulcrum point 52 on the clutch cover side of the lever members 45 toward the friction facings 4a by an amount corresponding to the wear in the next clutch releasing operation when the wear occurs on the friction facings 4a of the clutch disk assemblies 4.

The wear compensating mechanism 18' is primarily formed of the biasing mechanism 55' and a wear amount detecting mechanism 56'. The biasing mechanism 55' is a mechanism for biasing the fulcrum ring 60', which will be described later in greater detail, toward the first axial side and therefore toward the clutch disk assemblies 4. The wear amount detecting mechanism 56' is a restricting mechanism that restricts movement of the adjustment ring 59' of the biasing mechanism 55' toward the first axial side, and thus allowing movement of the adjustment ring 59' toward the first axial side by an amount corresponding to the amount of wear in the release operation subsequent to occurrence of the wear in the clutch disk assemblies 4.

As seen in FIG. 10, the biasing mechanism 55' is disposed within the accommodating portion 29' of the clutch cover 15'. The biasing mechanism 55' is primarily formed of the adjustment ring 59' fixedly coupled to the clutch cover 15', the fulcrum ring 60' and a biasing member formed of a plurality of adjustment springs 61'.

The adjustment ring 59' (first ring member) is disposed on the first axial side with respect to the annular portion 26' of the clutch cover 15'. The fulcrum ring 60' (second ring member) is disposed on the first axial side with respect to the adjustment ring 59'. These members or rings 59' and 60' are in axial contact with each other. The bottom surface (first axial side surface of the annular portion 26') of the groove 32' in the clutch cover 15', the second axial side surface of the adjustment ring 59' and the second axial side surface of the fulcrum ring 60' are perpendicular to the rotation axis O—O of the clutch device 100.

The adjustment ring 59' is an annular member, and is arranged rotatably on the bottom surface of the annular portion 26' of the clutch cover 15'. The adjustment ring 59' has the outer peripheral surface supported on the inner peripheral surface of the cylindrical portion 23', and also has the inner peripheral surface supported on the outer peripheral surface of the annular projection 30'. The adjustment ring 59' is provided on its first axial side surface with a plurality of first inclined surfaces 59a'. Each first inclined surface 59a' is formed by a concavity in the radially middle portion of the first axial side surface of the adjustment ring 59'. Each first inclined surface 59a' extends in the circumferential direction, and is inclined such that the axial height thereof gradually increases as the position moves in the rotating direction R1.

The adjustment ring 59' is provided at its outer periphery with a flange 59b'. The flange 59b' is an annular portion located on the second axial side of the outer peripheral surface of the adjustment ring 59'. Second inclined surfaces 59c' are formed on the first axial side surface of the flange 59b'. Each second inclined surface 59c' extends in the circumferential direction, and is inclined such that the axial height thereof gradually increases as the position moves in the rotating direction R1.

The fulcrum ring 60' is in contact with the first axial side of the adjustment ring 59'. The fulcrum ring 60' has the outer peripheral surface supported on the inner peripheral surface of the cylindrical portion 23', and is non-rotatably and axially movably engaged with the inner peripheral surface of the cylindrical portion 23' via groove engagement or the like. The fulcrum ring 60' is provided at its second axial side surface with a plurality of inclined surfaces 60a' (complementary inclined surfaces) corresponding to the first inclined surfaces 59a', respectively. Each of the inclined surfaces 60a' is in complementary contact with the corresponding first inclined surface 59a'. More specifically, the first inclined surfaces 59a' of the adjustment ring 59' and the inclined surfaces 60a' of the fulcrum ring 60' form a first wedge mechanism.

The adjustment springs 61' are disposed in an annular space or a plurality of arc-shaped grooves 59d' are formed on the second axial side surface of the adjustment ring 59'. Each adjustment spring 61' is employed for biasing the adjustment ring 59' in the rotating direction R2 with respect to the clutch cover 15'. The adjustment springs 61' can be either tension springs or compression springs. Owing to the biasing by the adjustment springs 61', a force is applied from the first inclined surfaces 59a' of the adjustment ring 59' to the inclined surfaces 60a' of the fulcrum ring 60', and the axial component of this force always biases the fulcrum ring 60' toward the first axial side. A bolt 58' is attached to the clutch cover 15' for preventing drop of the adjustment springs 61' from the grooves 59d'.

The inclination angles $\theta_1$ of the first inclined surfaces 59a are larger than the inclination angles $\theta_2$ of the second inclined surfaces 59c, and a ratio $\theta_1/\theta_2$ between them is equal to a value obtained by multiplying the ratio L1/L2 of the lever members 45 by r1/r2, where r1 is an average radius of the first inclined surfaces 59a', and r2 is an average radius of the second inclined surfaces 59c', as measured from the rotation axis O—O. The inclination angle is an angle defined with respect to a plane normal to the rotation axis O—O of the clutch device 100 (see FIG. 12).

As described above, the biasing mechanism 55' of the wear compensating mechanism 18' is primarily formed of the adjustment ring 59' and the fulcrum ring 60' so that the parts can be smaller in number than the conventional structure.

In this embodiment, the wear detecting mechanism 56' is formed of, e.g., two mechanisms, which are arranged in the diametrically opposite positions, respectively, and each of the wear detecting mechanisms are formed of a roll pin 73, a nut 74' and a bolt 75.

Each roll pin 73 is fitted into one of the axial apertures 24a' formed in the flat portion 24' of the clutch cover 15'. Each roll pin 73 is formed of a cylindrical spring member provided with an axial slit, which elastically contacts the surface of the corresponding axial aperture 24a'. As described above, the roll pins 73 are frictionally engaged with the apertures 24a' of the clutch cover 15' such that they do not axially move until a force of a predetermined magnitude is applied thereto. In the clutch engaged state shown in FIG. 10, the end surface on the first axial side of the roll pin 73 does not protrude beyond the end surface on the first axial side of the flat portion 24' of the clutch cover 15'. The axial space between this end surface on the first axial side and the end surface on the second axial side of the pressure plate 16 defines an amount (i.e., a release stroke of the pressure plate), which the pressure plate 16 can move toward the second axial side in the clutch releasing operation.

The apertures 24a' are formed corresponding to the cylindrical portion 23', and the corresponding portions of the cylindrical portion 23' are radially penetrated.

The corresponding nuts 74' are fitted into the corresponding roll pins 73. Each nut 74' is provided on its first axial side with a screw hole 74a', and a flange 74b' on its second axial side. The flange 74b' contacts the second axial side surface of the nut 73. The end on the first axial side of the nut 74' is shifted toward the second axial side with respect to the first axial side of the roll pin 73. In this embodiment, the nut 74' is fitted into the roll pin 73, and does not axially move away from the roll pin 73. The nut 74' and the roll pin 73 can be fixed by a manner other than the above pressure fitting.

A threaded portion 77 of the bolt 75 is engaged with the screw hole 74a' of the nut 74'. A head 78 of the bolt 75 is arranged within an axial aperture 79 in the pressure plate 16. The axial aperture 79 in the pressure plate 16 is located in the position corresponding to the axial aperture 24' of the clutch cover 15'. The axial aperture 79 is formed of a first aperture 80 opened at the pushing surface 37 and a second aperture 81, which continues to the first aperture 80 and is opened at the second axial side surface. The second aperture 81 is coaxial with the first aperture 80, but has a smaller diameter than the first aperture 80. The head 78 of the bolt 75 is in contact with the bottom surface of the first apertures 80.

Owing to the above structure, the bolt 75, the nut 74' and the roll pin 73 form an axially movable single member, which can move from the position shown in FIG. 10 toward the pressure plate 16, but cannot move away from the pressure plate 16. Thereby, the pressure plate 16 receives a resistance force from the bolt 75 when it moves toward the second axial side from the position shown in FIG. 10, but can freely move toward the first axial side until it comes into contact with the roll pin 73. A bolt cap 83 is engaged with the side near the pushing surface 37 of the first aperture 80 for preventing drop of the bolt 75.

The flange 74b' of each nut 74' is provided with an engagement portion 74c', which extends radially inward. The engagement portion 74c' is arranged on the first axial side of the flange 59b'. The surface on the second axial side of the engagement portion 74c' forms an inclined surface 74d', which is inclined in the rotating direction, and is in complementary contact with one of the second inclined surfaces 59c' of the adjustment ring 59'. In this manner, the second inclined surfaces 59c' and the inclined surfaces 74d' form a second wedge mechanism. When the nuts 74' and the roll pins 73 receive an axial force from the adjustment ring 59', of which second inclined surfaces 59b' are in contact with the inclined surfaces 74d', the roll pins 73 receives a resistance force from the apertures 24a' in the clutch cover 15'. In other words, the nuts 74' and the roll pins 73 are axially movably and frictionally engaged with the clutch cover 15', and functions as a movement stop mechanism for supporting the load of the biasing mechanism 55'. The configurations, structures, arrangements and others of the members of the movement stop mechanism are not restricted, provided that the above function can be achieved. Further another member may be added to the above structures for forming the stop mechanism.

In summary, the wear amount detecting mechanism 56' described above is not a mechanism for stopping axial movement of the pressure plate with respect to the clutch cover in contrast to the prior art, but is a mechanism for stopping the biasing mechanism 55' which directly drives the fulcrum ring 60'. More specifically, the wear amount detecting mechanism 56' stops the operation of the biasing mechanism 55' by stopping rotation of the adjustment ring 59' applying an axial force to the fulcrum ring 60'. The wear amount detecting mechanism 56' cooperates with the adjustment ring 59' to form the second wedge mechanism, and thereby operates to inhibit and allow the rotation of the adjustment ring 59'. The wear amount detecting mechanism 56' cooperates with the biasing mechanism 55' to form therebetween the space, in which the biasing mechanism 55' can operate. This space depends on only the positional relationship between the biasing mechanism 55' and the wear amount detecting mechanism 56', both of which are supported by the clutch cover 15'. Thus, the above space (i.e., an amount allowing movement of the fulcrum ring 60') is not affected by the position and movement of the pressure plate 16 as well as the size of the space between the fulcrum ring 60' and the lever members 45.

The release device 6 shown in FIG. 8 is a device for releasing the clutch device 100 by pulling the ends of the lever members 45 toward the second axial side, and is primarily formed of a sleeve 82 and a release bearing 84. The sleeve 82 is a cylindrical member arranged around the transmission input shaft 3. The radially outer flange 82a formed on the first axial end of the sleeve 82 is in contact with the first axial side of the inner peripheral surface of the inner flange 46b of the retainer 46.

The release bearing 84 is arranged around the second axial end of the sleeve 82. The inner race 84a of the release bearing 84 is fixed to the sleeve 82. An outer peripheral wall 85 is fixed to an outer race 84b of the release bearing 84. The outer peripheral wall 85 is provided at diametrically opposite two positions with engagement portions 86, respectively. A release fork 87 is swingably supported by support means (not shown) attached to a clutch housing (not shown), and is coupled to a clutch operating mechanism (not shown). An end of the release fork 87 is opposed to the first axial sides of the engagement portions 86 of the outer peripheral wall 85 with a predetermined space therebetween.

A coil spring 88 is arranged axially between the inner race 84a of the release bearing 84 and the radially inner portion of the retainer 46. The coil spring 88 biases the retainer 46 against the sleeve 82. The retainer 46 thus biased toward the first axial side is pushed against the sleeve 82 so that the inner flange 46b and the outer flange 82a are not axially spaced from each other. As a result, the sleeve 82 and the inner race 84a can rotate together with the clutch cover 15'.

Further, a clutch brake 7 is arranged on the wall surface of the transmission housing (not shown). A predetermined axial space (clutch brake gap) is kept between the clutch brake 7 and the release bearing 84. The clutch brake 7 is a mechanism for achieving smooth shifting of the transmission. More specifically, the clutch brake 7 is held between the release device 6, which is in the end position on the second axial side within the movable range, and the wall of the transmission housing, and thereby functions to stop the rotation of the transmission input shaft 3. The clutch brake gap is equal to a value obtained by multiplying the release stroke of the pressure plate 16 by the leverage of the lever members 45. The state in which the release bearing 84 is in contact with the clutch brake 7 is referred to as a "maximum release state".

Operation of Second Embodiment

In the clutch engaged state shown in FIG. 8, the lever members 45 apply a pushing force to the pressure plate 16. Further, strap plates 41 apply the biasing force to the pressure plate 16 to move it away from the clutch disk assemblies 4. More specifically, a force obtained by subtracting the biasing force from the pushing force is applied from the pressure plate 16 to the clutch disk assemblies 4. In this state, the fulcrum ring 60' and the roll pin 73 do not move axially.

Description will now be given on a wear compensating operation in the clutch cover assembly 5', which is performed when wear occurs in the clutch disk assemblies 4.

When the wear occurs in the clutch disk assemblies 4, which were in the state shown in FIG. 8, the pressure plate 16 moves toward the friction surface 11 in accordance with the wear. In this operation, the pressure plate 16 acts on each bolt 75 to move the corresponding nut 74' and roll pin 73 with respect to the clutch cover 15' toward the flywheel 2 by an amount equal to the wear amount. More specifically, the structures are configured such that the force acting on the pressure plate 16 toward the flywheel is larger than the static friction force acting on the roll pins 73 from the clutch cover 15'. Consequently, the engagement portion 74c' of each nut 74' is axially spaced from the second inclined surfaces 59c' of the adjustment ring 59' by an amount equal to the wear amount.

Then, the clutch release operation is performed. When an operator depresses a clutch pedal, a clutch operating mechanism operates the release fork 87 to move the release device 6 toward the second axial side. More specifically, the ends of the release fork 87 come into contact with the engagement portions 86 on the outer peripheral wall 85, and move the entire release device 6 toward the second axial side. Thereby, the release device 6 moves the radially inner ends of the diaphragm spring 44 and lever members 45 toward the second axial side via the retainer 46. As a result, the pushing force applied from the lever members 45 to the pressure plate 16 is released, and the pressure plate 16 biased by the strap plates 41 moves toward the second axial side.

In the clutch released state, the adjustment ring 59' rotates in the rotating direction R2 to move the fulcrum ring 60' toward the first axial side. This is allowed owing to such setting that the axial component of the force acting on the fulcrum ring 60' from the adjustment ring 59' is larger than the biasing force of the strap plates 41. As a result, the support portions 40' of the lever members 45 and the pressure plate 16 move toward the first axial side.

When the second inclined surfaces 59c' of the adjustment ring 59' comes into contact with the inclined surfaces 74d' of the nuts 74', the periphery of the apertures 24a' in the clutch cover 15' applies a resistance force to the roll pins 73 so that the rotation of the adjustment ring 59' stops. Thus, the fulcrum ring 60' no longer moves axially.

In the foregoing operation, the fulcrum ring 60' axially moves a distance S. The distance S is larger than a wear amount W, and is equal to a product of the wear amount W and the ratio $\theta_1/\theta_2$ $(=(L1/L2)\times(r1/r2))$. In this manner, the height of the end (radially inner end) of each lever member 45 can be kept constant. If the moved distance of the fulcrum ring 60' were equal to the wear amount W, an axial space would occur between the support member and the fulcrum of the lever member after compensation of the wear so that the fulcrum would move toward the clutch cover in the next clutch engaged state, and therefore the attitude or inclination of the lever member would change. Thus, the end (radially inner end) of the lever member would move toward the flywheel.

Owing to the wear compensating operation described above, the axial position of the fulcrum points 52 of the lever members 45 are shifted toward the first axial side in accordance with the wear amount of the friction facings 4a. As a result, the fulcrum points 52 and the force applying points 51 of the lever members 45 are shifted in the first axial direction in accordance with the wear amount, and therefore the axial position of the force receiving points 50 are constant although the attitude of the lever members 45 are changed. Accordingly, the attitude of the diaphragm spring 44 does not change, and the axial positions of the retainer 46, sleeve 82 and release bearing 84 do not change. Thus, the axial space between the end of the release fork 87 and the engagement portion 86 of the release device 6 as well as the clutch brake gap do not change.

In this embodiment, the relationship between the first and second inclined surfaces 59a' and 59c' of the adjustment ring 59' is appropriately set so that the wear adjustment can be performed in expectation of the wear amount of each of the fulcrum portions of the lever members and the diaphragm spring.

Modifications of Second Embodiment

The invention is not restricted to the clutch device 100 of the second embodiment of the present invention. The present invention can be employed in various devices such as a clutch device including only one clutch disk assembly, a clutch device which includes a pushing member formed of only a diaphragm spring or the like, a clutch device which includes pushing members formed of a lever member and independent springs, and/or a clutch device which is configured to release the clutch by pushing the pushing member toward the flywheel. Also, the provision of the clutch brake 7 is not essential. In the clutch cover assembly according to the present invention, the wear compensating mechanism is primarily formed of the first and second ring members so that the parts can be smaller in number than the conventional structure.

Third Embodiment

Figure 13:
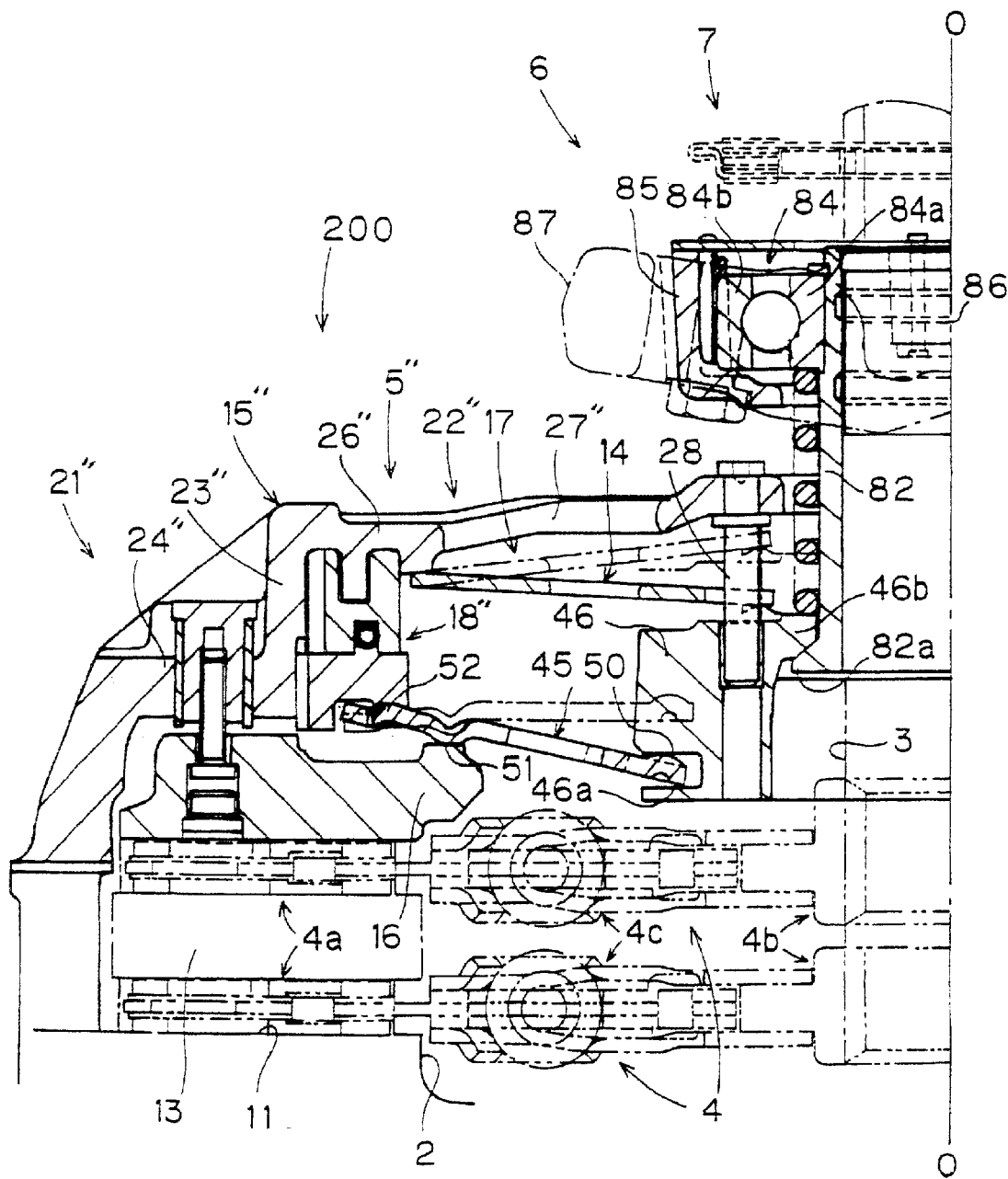
FIG. 13 is a partial schematic cross sectional view of a clutch device employing a clutch cover assembly of a third embodiment of the present invention in a clutch engaged state before wear has occurred.
Figure 14:
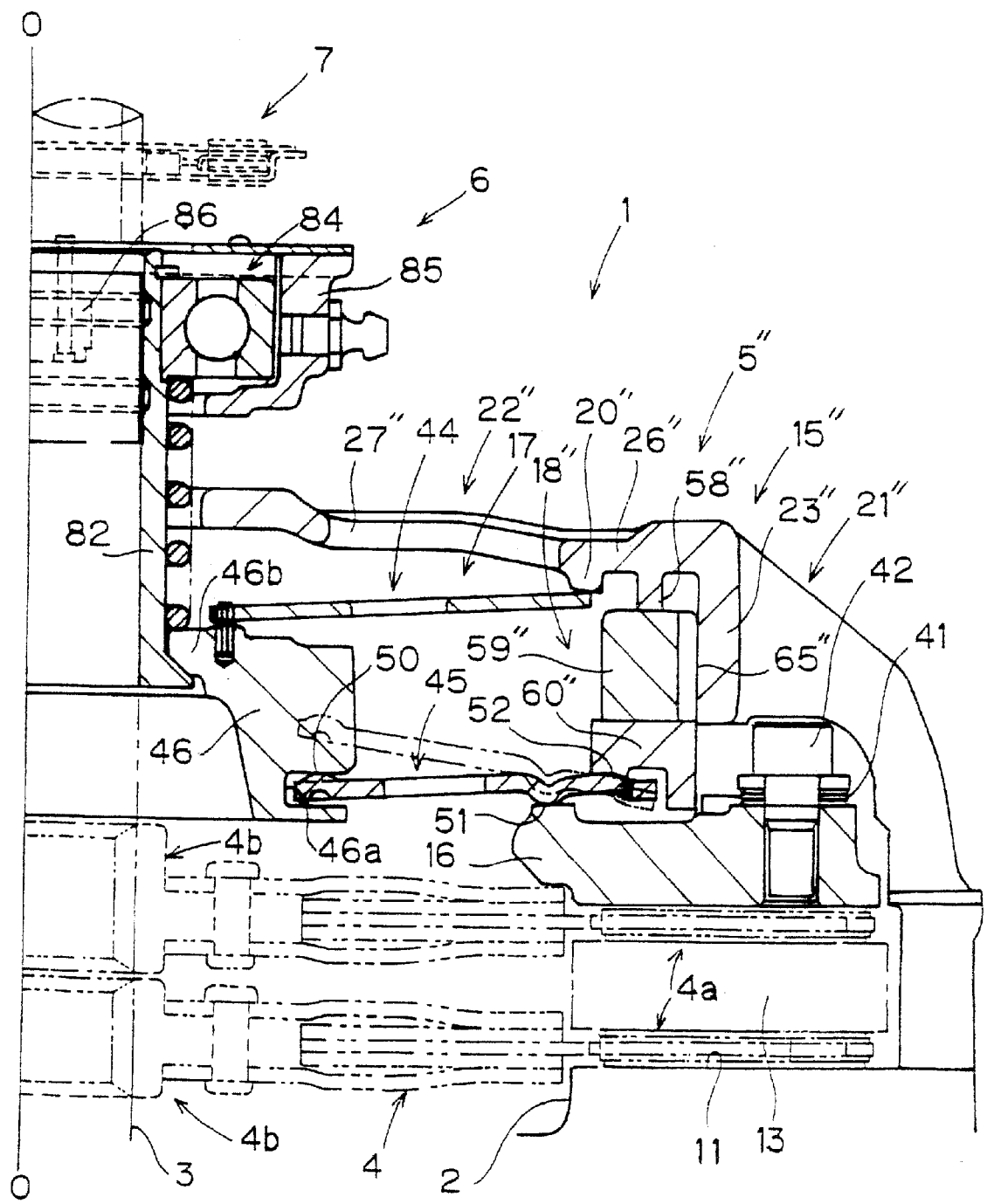
FIG. 14 is a partial schematic cross sectional view of the clutch device employing the clutch cover assembly of the third embodiment of the present invention illustrated in FIG. 13 in the clutch engaged state after wear has occurred.
Figure 15:
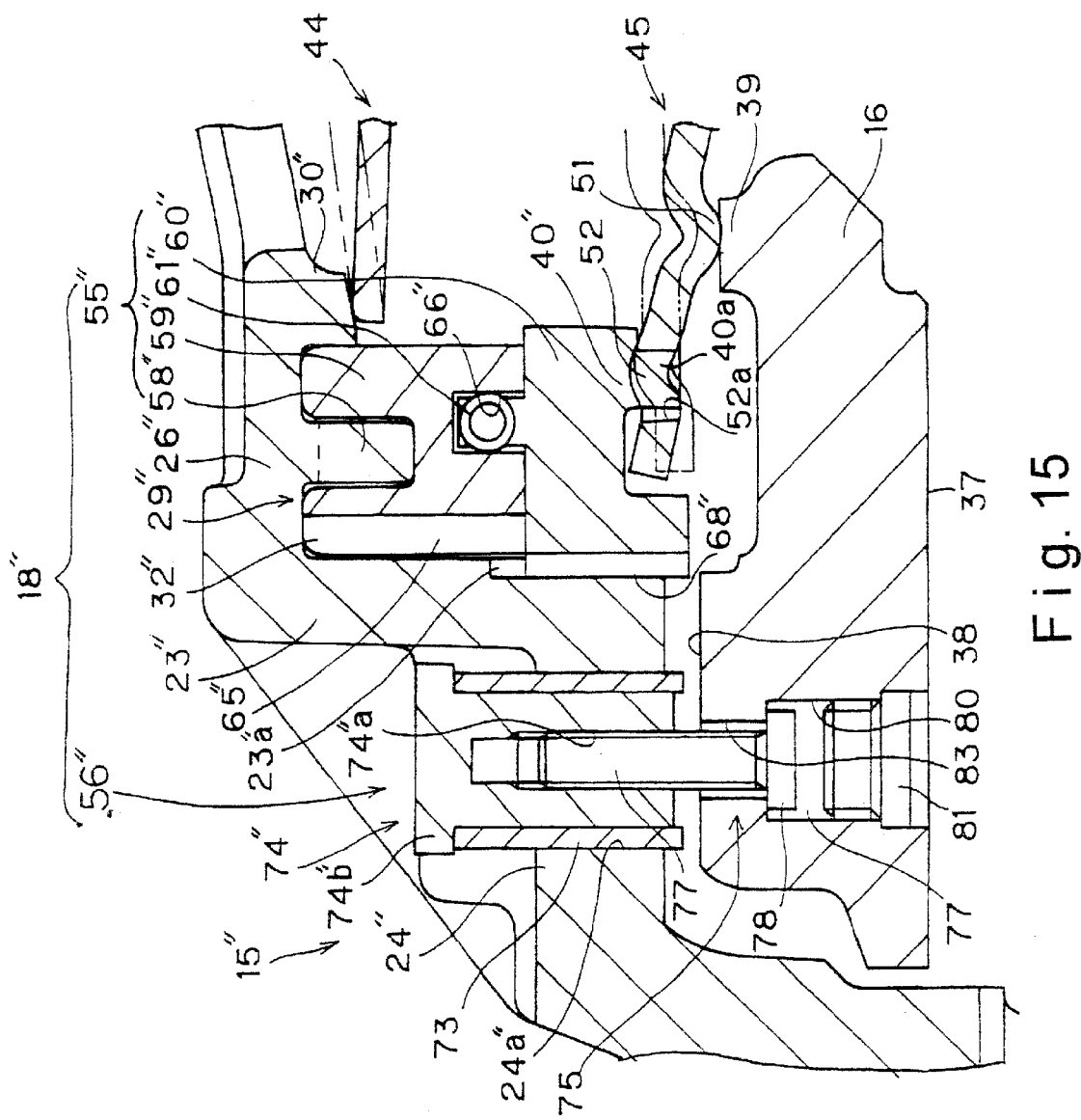
FIG. 15 is an enlarged partial schematic cross sectional view of a wear compensating mechanism of the clutch cover assembly of the third embodiment of the present invention illustrated in FIGS. 13 and 14.
Figure 16:
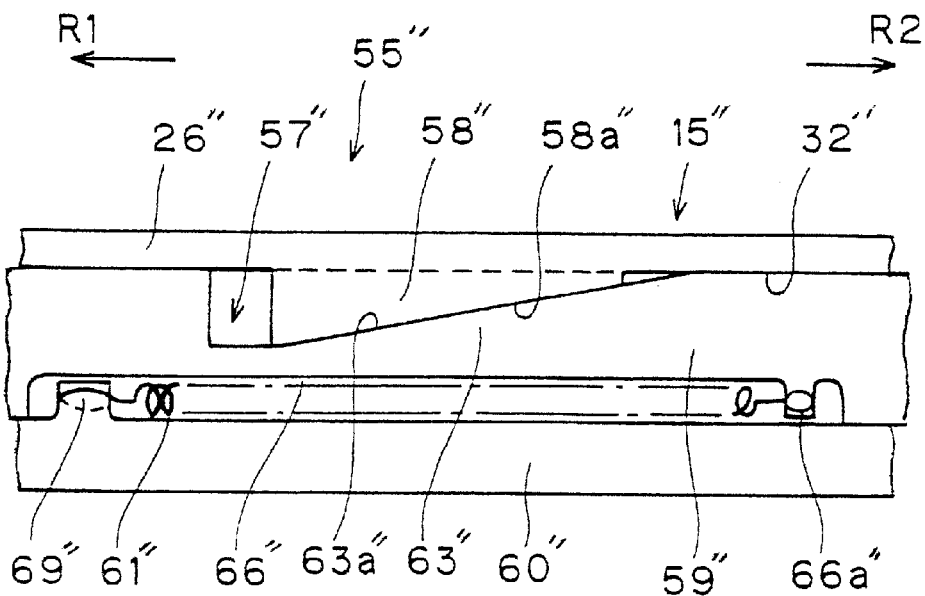
FIG. 16 is an enlarged partial schematic view of a wedge mechanism formed with two kinds of inclined surfaces used in the wear compensating mechanism of the clutch cover assembly of the third embodiment of the present invention illustrated in FIGS. 13–15.
Figure 17:
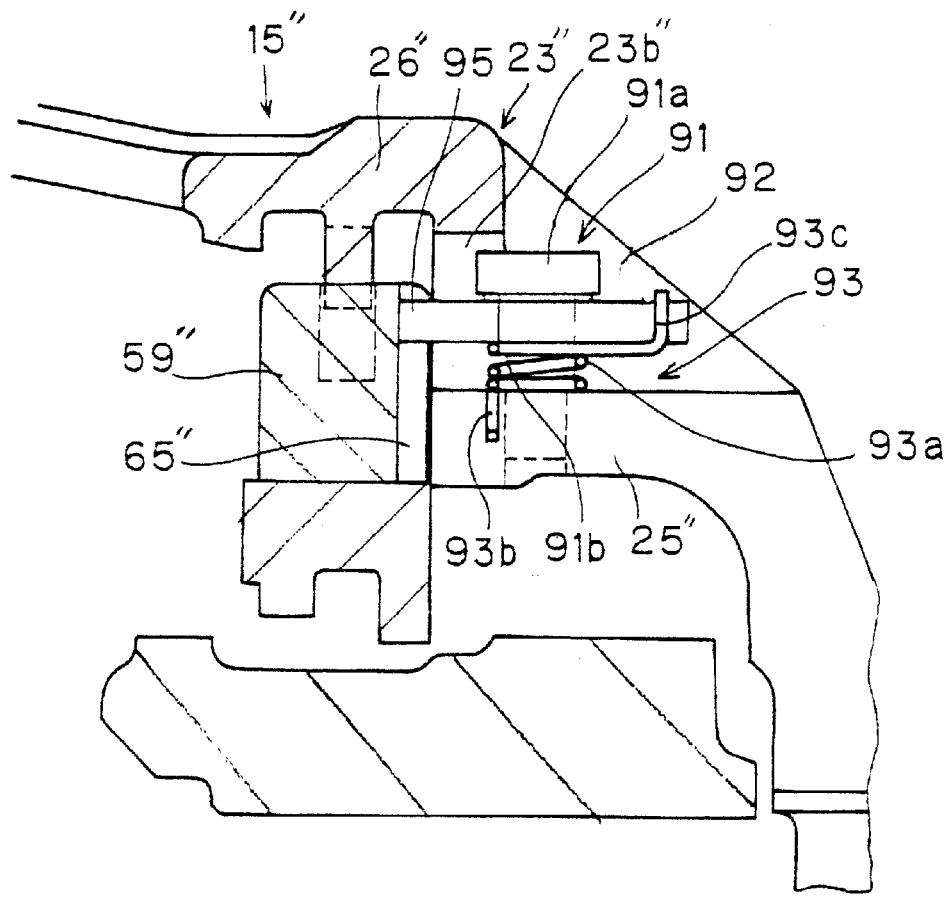
FIG. 17 is an enlarged partial schematic cross sectional view of a lock mechanism of the clutch cover assembly of the third embodiment of the present invention illustrated in FIGS. 13–16.

Referring now to FIGS. 13–18, clutch device 200 is illustrated in accordance with a third embodiment of the invention. The clutch device 200 is employed in a vehicle, and particularly a large vehicle such as a truck. The clutch device 200 is a device for transmitting a torque from a flywheel 2 of an engine to an input shaft 3 of a transmission, and for intercepting such torque transmission when necessary. In view of the similarity between the first and third embodiments, the parts of the clutch device 200 of the third embodiment that are identical to the parts of the first embodiment will be given the same reference numerals as the parts of the first embodiment. Moreover, the description of the parts of the clutch device 200 of the third embodiment that are identical to the parts of the first embodiment may be omitted. The parts of the clutch device 200 of the third embodiment that differ from the parts of the clutch device 10 the first embodiment will be indicated with a double prime (") The clutch device 200 is primarily formed of a pair of clutch disk assemblies 4, a clutch cover assembly 5 and a release device 6. As seen in FIGS. 13 and 14, a center line O—O indicates a rotation axis of the clutch device 200. The lower side in FIG. 13 will be referred to herein as a first axial side (engine side), and the upper side in FIG. 13 will be referred to herein as a second axial side (transmission side). In FIGS. 16 and 17, a direction R1 indicated by arrows is a rotating direction of the clutch device 200, and a direction R2 indicated by arrows is a reverse direction of the clutch device 200. When the clutch device 200 is engaged before wear occurs in the clutch disk assemblies 4, the various members of the clutch device 200 take the positions and attitudes shown in FIG. 13. When the clutch device 200 is engaged and wear has occurred in the clutch disk assemblies 4 to a certain extent, the various members of the clutch device 200 take the positions and attitudes shown in FIG. 14. The transmission provided with the clutch device 200 is of a type not having a synchronous mechanism, and therefore, the clutch device 200 is provided with a clutch brake 7, which will be described later.

The flywheel 2 is a circular disk-shaped member that is attached to an end of a crankshaft (not shown) of the engine. The flywheel 2 is provided with an annular flat friction surface 11 at the second axial side of the radially outer portion.

The clutch disk assemblies 4 are disposed close to the second axial side of the flywheel 2. The clutch disk assemblies 4 are configured to be coupled to the flywheel 2 for transmitting the torque of the engine to the transmission input shaft 3. Preferably, two clutch disk assemblies 4 are employed in this clutch device 200, each having a pair of friction facings 4a (friction members) arranged at its radially outer portion, a hub 4b coupled to the transmission input shaft 3, and a damper mechanism 4c elastically coupling the friction facings 4a to the hub 4b in the rotating direction. One of the friction facings 4a of one of the clutch disk assemblies 4 is disposed close to the friction surface 11 of the flywheel 2. One of the friction facings 4a of the other clutch disk assembly 4 is remote from the friction surface 11 of the flywheel 2, and is located on the second axial side with respect to the flywheel 2, so as to engage pressure plate 16. An intermediate plate 13 is disposed axially between the adjacent friction facings 4a of the two clutch disk assemblies 4. The intermediate plate 13 is nonrotatable but is axially movable with respect to the clutch cover 15, which will be described later.

The clutch cover assembly 5" is a device for transmitting and intercepting the torque of the flywheel 2 via the clutch disk assemblies 4. The clutch cover assembly 5" is attached to the flywheel 2. As seen in FIG. 15, the clutch cover assembly 5" basically includes the clutch cover 15", a pressure plate 16, a pushing mechanism 17 and a wear compensating mechanism 18".

The clutch cover 15" is an annular member fixedly coupled to the flywheel 2. More specifically, the radially outer portion of the clutch cover 15" is fixedly coupled to the flywheel 2 by bolts. The clutch cover 15" covers the outer periphery of the clutch disk assemblies 4. The clutch cover 15" is located on the second axial side of the clutch disk assemblies 4. In this manner, the clutch cover 15" is axially opposed to the friction surface 11 of the flywheel 2.

The clutch cover 15 is primarily formed of a radially outer covering portion 21", a disk-shaped portion 22" and a cylindrical portion 23" formed between these portions 21" and 22". The radially outer covering portion 21" has a substantially cylindrical form for covering the outer periphery of the pressure plate 16, and has a radially outer end fixed to the flywheel 2 by bolts (not shown) in a conventional manner. The radially outer covering portion 21" has recesses at several portions to form radially outward openings. Referring to FIG. 15, the radially outer covering portion 21" is provided with a plurality of flat portions 24" and 25" located radially outside the cylindrical portion 23". The flat portions 24" and 25" are continuous to the end on the first axial side of the cylindrical portion 23", and are axially opposed to a surface 38, on the second axial side, of the radially inner portion of the pressure plate 16 with a space therebetween.

The disk-shaped portion 22" extends radially inward from the end, on the second axial side, of the radially outer covering portion 21". The disk-shaped portion 22" has the inner periphery neighboring to the outer periphery of the input shaft 3. The disk-shaped portion 22" is provided at its radially middle portion with a plurality of circumferentially spaced apertures 27", and also has an annular portion 26", which forms the radially outer portion of the disk-shaped portion 22". The annular portion 26" is located radially and immediately inside the cylindrical portion 23". Rod-like members 28 are fixedly coupled to the portion of the disk-shaped member 22" near its inner periphery. Each rod-like member 28 extends from the radially inner end of the clutch cover 15" toward the first axial side.

As shown in FIG. 15, an accommodating portion 29" is formed in a position radially inside the cylindrical portion 23" of the clutch cover 15" for accommodating a biasing mechanism 55" of the wear compensating mechanism 18", which will be described later. Thus, the accommodating portion 29 is located on the first axial side of the annular portion 26". The annular portion 26" is provided at its inner periphery with an annular projection 30" projecting in the first axial direction. An annular groove 32" is defined between the cylindrical portion 23" and the annular projection 30".

The pressure plate 16 is an annular member, which is located radially inside the clutch cover 15" and axially between the clutch cover 15" and the friction facings 4a of the clutch disk assemblies 4 on the second axial side of the intermediate member 13. The surface on the first axial side of the pressure plate 16 forms an annular, flat pushing surface 37. The pressure plate 16 is provided at its second axial side with a second axial side surface 38, which is opposed to the clutch cover 15". Further, an annular support portion 39 is formed radially inside the second axial side surface 38. The support portion 39 projects toward the second axial side beyond the other portions.

The pressure plate 16 is coupled to the clutch cover 15" by a plurality of strap plates 41 as shown in FIG. 14. More specifically, the strap plates 41 are circumferentially and equally spaced around the clutch cover 15". Each strap plate 41 is fixed at one of its ends on the R2 side to the radially outer portion of the pressure plate 16 by a bolt 42, and is also fixed at one of its ends on the R1 side by a bolt (not shown) to the clutch cover 15". Owing to this coupling arrangement, the pressure plate 16 can rotate in the RI direction together with the clutch cover 15". In the clutch engaged state, the strap plates 41 are axially bent to bias the pressure plate 16 toward the second axial side. A head of each bolt 42 is arranged correspondingly to the foregoing recess in the clutch cover 15".

The pushing mechanism 17 is employed for applying a pushing or urging force on the pressure plate 16 for clutch engagement. The pushing mechanism 14 is formed of a diaphragm spring 44, a plurality of lever members 45 and a retainer 46.

The retainer 46 is an annular member that is arranged close to the outer periphery of the input shaft 3. The retainer 46 has an annular groove 46a formed at its outer peripheral surface and a radially inner flange 46b at its inner peripheral surface.

The lever members 45 are preferably formed of a plurality of radial plate members, which are circumferentially spaced from each other around the first axial side of the retainer 46. Each lever member 45 has a radially inner end engaged with the retainer 46, and a radially outer end engaged with the pressure plate 16 and the fulcrum ring 60". The lever members 45 can be replaced with a single annular plate. The radially inner ends of the lever members 45 are fitted into a groove 46a of the retainer 46. The first axial sides of the radially inner ends of the lever members 45 form a radially curved convex surface, which is in swingable contact with the first axial side surface of the groove 46a. The radially outer portions of the lever members 45 are arranged axially between the pressure plate 16 and the clutch cover 15" (and particularly, the accommodating portion 29"). The second axial side surfaces of the radially outer portions of the lever members 45 are supported by the fulcrum ring 60". The first axial side surfaces of the portion of the lever members 45, which are located radially inside the foregoing support portion, are supported by the support portion 39 of the pressure plate 16.

The diaphragm spring 44 is axially spaced from the second axial sides of the lever members 45. The second axial side surface of the outer peripheral surface of the diaphragm spring 44 is supported by the annular projection 30" of the clutch cover 15" (and particularly, in the accommodating portion 29"). The radially inner end of the diaphragm spring 44 is in contact with the second axial side surface of the retainer 46. In this state, the diaphragm spring 44 biases the radially inner ends of the lever members 45 toward the first axial side via the retainer 46.

The radially inner end of the diaphragm spring 44 is engaged with the rod-like members 28 for preventing rotation. The retainer 46 is provided with apertures fitted with the respective rod-like members 28 so that the rod-like members 28 can guide the retainer 46 for axial movement.

Each lever member 45 has a force receiving point 50 at its radially inner position for receiving a power directed toward the first axial side from the retainer 46, a force application point 51 at its radially middle position for applying the force to the pressure plate 16, and a fulcrum point 52 at its radially outer position to be supported by the clutch cover 15". Each of the points 50, 51 and 52 is actually a linear portion having an arc-shaped or annular form extending around the central rotation axis O—O. The force application point 51 is defined by a portion of each lever member 45 projected toward the first axial side. The force application point 51 is in contact with the support portion 39 of the pressure plate 16. The fulcrum point 52 is defined by a portion of the lever member 45 projected toward the second axial side. The fulcrum point 52 is in contact with the annular support portion 40" formed on the first axial side surface of the fulcrum ring 60". The portion forming the fulcrum point 52 is provided with a plurality of circumferentially spaced apertures 52a, into which the projections 40a extending from the support portion 40" of the fulcrum ring 60" are fitted, respectively. As a result, the lever members 45 rotate together with the clutch cover 15". It is assumed that the radial distance from the force receiving point 50 to the fulcrum point 52 is equal to L1, the radial distance from the force receiving point 50 to the force applying point 51 is equal to L2, and the radial distance from the point 51 to the fulcrum point 52 is equal to L3. Thereby, the pushing load transmitted from the diaphragm spring 44 to the lever members 45 is increased by L2/L3 times for transmission to the pressure plate 16.

The wear compensating mechanism 18" will now be described. The wear compensating mechanism 18", which is shown in FIG. 15 in greater detail, has the purpose of restoring the axial position or height of the force receiving point 50 (i.e., the radially inner end of each lever member 45) to the initial position or height after the friction facings 4a of the clutch disk assemblies 4 are worn. In other words, the wear compensating mechanism 18" has the purpose of keeping a release bearing 84 at a constant axial position, and thereby keeping a constant clutch-brake gap. For this purpose, the wear compensating mechanism 18" is configured to move the fulcrum point 52 on the clutch cover sides of the lever members 45 toward the friction facings 4a by an amount corresponding to the wear in the next clutch releasing operation when the wear occurs on the friction facings 4a of the clutch disk assemblies 4.

The wear compensating mechanism 18" is primarily formed of the biasing mechanism 55" and the wear amount detecting mechanism 56". The biasing mechanism 55" is a mechanism for biasing the fulcrum ring 60", which will be described later, toward the first axial side and therefore toward the clutch disk assemblies 4 by a constant force. The wear amount detecting mechanism 56" is a mechanism for allowing movement of the pressure plate 16 toward the second axial side by an amount corresponding to the amount of wear in the subsequent release operation when the wear occurs on the friction facings 4a of the clutch disk assemblies 4, and thereby allowing the biasing mechanism 55" to move the fulcrum ring 60" in the axial direction.

The biasing mechanism 55" is disposed within the accommodating portion 29" of the clutch cover 15". The biasing mechanism 55" is primarily formed of a plurality of first inclined portions 58" formed in the clutch cover 15", an adjustment ring 59", the fulcrum ring 60" and a biasing member formed of a plurality of adjustment springs 61".

The adjustment ring 59" (first ring member) is disposed on the first axial side with respect to the clutch cover 15". The fulcrum ring 60" (second ring member) is disposed on the first axial side with respect to the adjustment ring 59". These members are in axial contact with each other. The bottom surface (first axial side surface of the annular portion 26") of the groove 32" of the clutch cover 15", the axially opposite side surfaces of the adjustment ring 59" and the second axial side surface of the fulcrum ring 60" are perpendicular to the rotation axis O—O of the clutch device 200.

The first inclined portions 58" are located in the groove 32". The first inclined portions 58" are integrally with the clutch cover 15", that are located in the radially middle portion of the groove 32". Each of the first inclined portions 58" extend circumferentially through a predetermined length. As shown in FIG. 16, each first inclined portion 58" is inclined such that the axial height thereof increases as the position moves in the rotating direction R1. In this manner, each inclined portion 58" provides an inclined surface 58a" directed toward the first axial side. In this structure, since one of the inclined surfaces forming the wedge mechanism is formed integrally with the clutch cover 15", the parts forming the biasing mechanism 55" are reduced in number.

The adjustment ring 59" is in contact with the bottom of the groove 32". The adjustment ring 59" has its outer peripheral surface supported on the inner peripheral surface of the cylindrical portion 23", and its inner peripheral surface supported on the outer peripheral surface of the annular projection 30". The adjustment ring 59" is provided at its second axial side surface with a plurality of second inclined portions 63" corresponding to the first inclined portions 58", respectively. More specifically, the adjustment ring 59" is provided with concavities 57" located in the portions of the second axial side surface corresponding to the respective first inclined portions 58", and the bottom of each concavity 57" forms the second inclined portion 63". The first inclined portions 58" are fitted into the concavities 57", and the inclined surfaces 58a" are in contact with the inclined surfaces 63a" of the second inclined portions 63". Thus, the first inclined portions 58" of the clutch cover 15" and the second inclined portions 63" of the adjustment ring 59" form a wedge mechanism.

The adjustment ring 59" is provided at its outer peripheral surface with outer teeth 65". The outer teeth 65" are aligned in the rotating direction, and each extend in the axial direction. The adjustment ring 59" is provided at its first axial side surface with a plurality of grooves 66" each extending in the rotating direction. The adjustment springs 61" are accommodated in the grooves 66", respectively. A spring engagement portion 66a" is arranged on the end in the rotating direction R2 of the groove 66".

The fulcrum ring 60" is in contact with the first axial side of the adjustment ring 59". The adjustment ring 59" and the fulcrum ring 60" are rotatable relatively to each other. The fulcrum ring 60" is provided at its outer peripheral surface with outer teeth 68". The outer teeth 68" are aligned in the rotating direction, and each extend in the axial direction. The outer teeth 68" are engaged non-rotatably and axially movably with inner teeth 23a" formed on the inner peripheral surface of the cylindrical portion 23" of the clutch cover 15".

The fulcrum ring 60" is provided at its second axial side surface with spring engagement portions 69" extending in the grooves 66" of the adjustment ring 59". The spring engagement portions 69" are located on the end in the rotating direction R1 of the grooves 66". The adjustment springs 61" extend in the rotating direction within the grooves 66". The end, in the rotating direction R2, of the adjustment springs 61" are engaged with the spring engagement portions 66a" of the adjustment ring 59", and the end in the rotating direction R1 is engaged with the engagement portions 69" of the fulcrum ring 60". The adjustment springs 61" are preferably tension coil springs that bias the adjustment ring 59" in the rotating direction R1 with respect to the fulcrum ring 60". Owing to the biasing by the adjustment springs 61", the first inclined portions 58" of the adjustment ring 59" applies a force to the second inclined portions 63" of the adjustment ring 59", and the axial component of this force always biases the adjustment ring 59" toward the first axial side. In this manner, the adjustment springs 61" function between the adjustment ring 59" and the fulcrum ring 60". Since the adjustment ring 59" and the fulcrum ring 60" are kept axially unmovable with respect to each other, the adjustment springs 61" functioning between them can keep a stable attitude. Thus, disadvantages of the adjustment springs 61" such as deformation and breakage due to inclination can be suppressed even when the wear compensation is performed to a larger extent. The adjustment springs 61" are disposed between the above members, and is not disposed between the adjustment ring 59" and the clutch cover 15". Accordingly, the first and second inclined portions 58" and 63" described above can be increased in number and area so that the required space can be further reduced. The adjustment spring or springs can be a compression spring or springs.

The wear amount detecting mechanism 56" is a mechanism for allowing movement of the pressure plate 16 toward the second axial side by an amount corresponding to the amount of wear in the release operation subsequent to occurrence of the wear in the clutch disk assemblies 4. In this embodiment, the wear detecting mechanism 56" is formed of, e.g., two mechanisms, which are arranged in the diametrically opposite positions, respectively, and each mechanism is formed of a roll pin 73, a nut 74" and a bolt 75. Each roll pin 73 is fitted into one of the axial apertures 24a" formed in the flat portion 24" of the clutch cover 15". The roll pins 73 are each formed of a cylindrical spring member provided with an axial slit, that elastically contacts the surface of one of the axial apertures 24a". As described above, the roll pins 73 are functionally engaged with the apertures 24" of the clutch cover 15" such that they do not axially move until a force of a predetermined magnitude is applied thereto. In the clutch engaged state shown in FIG. 15, a predetermined axial space is formed between the end surface on the first axial side of the roll pin 73 and the second axial side surface 38 of the pressure plate 16. This axial space defines an amount (i.e., a release stroke of the pressure plate), which the pressure plate 16 can move toward the second axial side in the clutch releasing operation. When the pressure plate 16 moves a distance equal to the release stroke in the second axial direction, it comes into contact with the roll pin 73, and the movement therefore is forcibly stopped so that the structure assumes the maximum release state, which will be described later.

The nuts 74" are fitted into the roll pins 73. Each nut 74" has a screw hole 74" on its first axial side, and a flange 74b" on its second axial side. The flange 74b" contacts the second axial side surface of the nut 73. The end on the first axial side of the nut 74" is shifted toward the second axial side with respect to the first axial side of the roll pin 73. In this embodiment, the nut 74" is fitted into the roll pin 73, and does not axially move away from the roll pin 73. The nut 74" and the roll pin 73 may be fixed by a manner other than the above pressure fitting.

A threaded portion 77 of the bolt 75 is engaged with the screw hole 74a" of the nut 74". A head 78 of the bolt 75 is arranged within an axial aperture 79 in the pressure plate 16. The axial aperture 79 in the pressure plate 16 is located in the position corresponding to the axial aperture 24" of the clutch cover 15". The axial aperture 79 is formed of a first aperture 80 opened at the pushing surface 37 and a second aperture 81, which continues to the first aperture 80 and is opened at the second axial side surface. The second aperture 81 is coaxial with the first aperture 80, but has a smaller diameter than the first aperture 80. The head 78 of the bolt 75 is in contact with the bottom surface of the first apertures 80.

Owing to the above structure, the bolt 75, the nut 74" and the roll pin 73 form an axially movable single member, which can move from the position shown in FIG. 15 toward the pressure plate 16, but cannot move away from the pressure plate 16. Thereby, the pressure plate 16 receives a resistance force from the bolt 75 when it moves toward the second axial side from the position shown in FIG. 15, but can freely move toward the first axial side until it comes into contact with the roll pin 73. A cap 83 is engaged with the side near the pushing surface 37 of the first aperture 80 bolt for preventing drop of the bolt 75.

The release device 6 shown in FIG. 13 is a device for releasing the clutch device 200 by pulling the ends of the lever members 45 toward the second axial side, and is primarily formed of a sleeve 82 and a release bearing 84. The sleeve 82 is a cylindrical member arranged around the transmission input shaft 3. The radially outer flange 82a formed on the first axial end of the sleeve 82 is in contact with the first axial side of the inner peripheral surface of the inner flange 46b of the retainer 46.

The release bearing 84 is arranged around the second axial end of the sleeve 82. The inner race 84a of the release bearing 84 is fixed to the sleeve 82. An outer peripheral wall 85 is fixed to an outer race 84b of the release bearing 84. The outer peripheral wall 85 is provided at diametrically opposite two positions with engagement portions 86, respectively. A release fork 87 is swingably supported by support means (not shown) attached to a clutch housing (not shown), and is coupled to a clutch operating mechanism (not shown). An end of the release fork 87 is opposed to the first axial sides of the engagement portions 86 of the outer peripheral wall 85 with a predetermined space therebetween.

A coil spring 88 is arranged axially between the inner race 84a of the release bearing 84 and the radially inner portion of the retainer 46. The coil spring 88 biases the retainer 46 against the sleeve 82. The retainer 46 thus biased toward the first axial side is pushed against the sleeve 82 so that the inner flange 46b and the outer flange 82a are not axially spaced from each other. As a result, the sleeve 82 and the inner race 84a can rotate together with the clutch cover 15".

Further, a clutch brake 7 is arranged on the wall surface of the transmission housing (not shown). A predetermined axial space (clutch brake gap) is kept between the clutch brake 7 and the release bearing 84. The clutch brake 7 is a mechanism for achieving smooth shifting of the transmission. More specifically, the clutch brake 7 is held between the release device 6, which is in the end position on the second axial side within the movable range, and the wall of the transmission housing, and thereby functions to stop the rotation of the transmission input shaft 3. The clutch brake gap is equal to a value obtained by multiplying the release stroke of the pressure plate 16 by the leverage of the lever members 45. The state in which the release bearing 84 is in contact with the clutch brake 7 is referred to as the "maximum release state".

Figure 18:
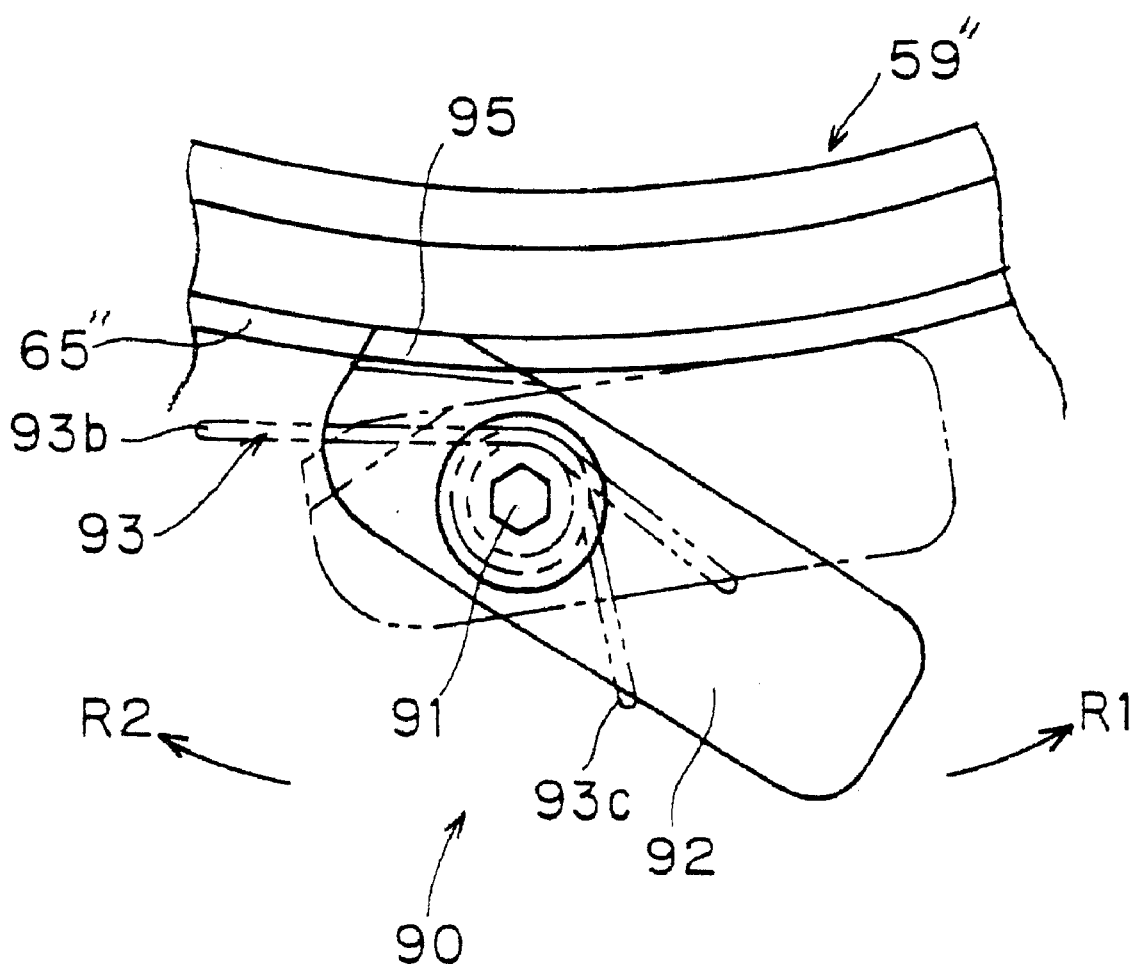
FIG. 18 is an enlarged partial elevational view of the lock mechanism of the clutch cover assembly of the third embodiment of the present invention illustrated in FIGS. 13–17.

A lock mechanism 90 shown in FIGS. 17 and 18 is a mechanism for stopping the operation of the wear compensating mechanism 18" and thus the biasing mechanism 55" when the rotation speed is equal to or larger than a predetermined speed (e.g., an idling speed of the engine). The lock mechanism 90 is provided at the flat portion 25" of the clutch cover 15". A recess 23b", which extends radially through the cylindrical portion 23", is formed in the position corresponding to the flat portion 25". The lock mechanism 90 is formed of a bolt 91, a lock member 92 and a torsion spring 93. The bolt 91 is screwed into the flat portion 25" from the second axial side. However, a head 91a of the bolt 91 is spaced from the second axial side surface of the flat portion 25". As can be seen from FIG. 18, the lock member 92 is formed of a plate, which is substantially rectangular in a plan view, as shown in FIG. 18. The lock member 92 is rotatable around the bolt 91. The lock member 92 is provided at a position shifted in the rotating direction R2 with an aperture, through which an unthreaded portion 91b of the bolt 91 extends. Thus, a portion of the lock member 92, which protrudes in the rotating direction R1 with respect to the bolt 91, is longer than the portion protruding in the rotating direction R2. The torsion spring 93 is a member for applying a force, which acts to rotate counterclockwise in FIG. 18 the lock member 92 around the bolt 91. A coil portion 93a of the torsion spring 93 is disposed around the unthreaded portion 91b of the bolt 91 and between the lock member 92 and the flat portion 25". The coil portion 93a functions also as a compression spring for biasing the lock member 92 against the head 91a of the bolt 91. A first arm 93b of the torsion spring 93 is fitted into a hole formed in the clutch cover 15". A second arm 93c of the torsion spring 93 is in contact with a side surface, on the forward side in the clockwise direction, of the portion, on the forward side in the rotating direction R1, of the lock member 92. In this manner, the torsion spring 93 rotates the lock member 92 around the bolt, and keeps it in the position indicated by alternate long and two short dashes line in FIG. 18.

The lock member 92 is provided at the radially inner side of its portion protruding in the rotating direction R2 with an engagement portion 95, which is engageable with the outer teeth 65" of the adjustment ring 59". The engagement portion 95 in the above position, which is indicated by the alternate long and two short dashes line, is spaced radially outward from the outer teeth 65". As the rotation speed and therefore the centrifugal force increase, the forward portion, in the rotating direction R1, of the lock member 92 moves radially outward so that the lock member 92 overcomes the biasing force of the torsion spring 93, and rotates clockwise around the bolt. Thereby, the engagement portion 95 moves radially inward to engage with the outer teeth 65". As a result, the adjustment ring 59"cannot rotate, and therefore cannot move axially.

Owing to the above manners, the wear compensating operation is performed only when the clutch releasing operation is performed during stop or low-speed driving such as idling of the engine. Even when the clutch release operation is performed when the engine speed is higher than, e.g., the idling speed, the wear compensation is not performed, and therefore it is possible to suppress excessive rotation of the adjustment ring 59", i.e., over-adjust, which may be caused by vibrations or shocks during the clutch release operation in a high-speed range.

Operation of Third Embodiment

In the clutch engaged state shown in FIG. 13, the lever member 45 applies a pushing force to the pressure plate 16. Further, strap plates 41 apply the biasing force to the pressure plate 16 to move it away from the clutch disk assemblies 4. More specifically, a force obtained by subtracting the biasing force from the pushing force is applied from the pressure plate 16 to the clutch disk assemblies 4. In this state, the fulcrum ring 60" and the roll pin 73 do not move axially.

Description will now be given on a wear compensating operation in the clutch cover assembly 5", which is performed when wear occurs in the clutch disk assemblies 4. When the wear occurs in the clutch disk assemblies 4, which was in the state shown in FIG. 13, the pressure plate 16 moves toward the friction surface 11 in accordance with the wear. In this operation, the pressure plate 16 acts on each bolt 75 to move the corresponding nut 74" and roll pin 73 with respect to the clutch cover 15" toward the flywheel 2 by an amount equal to the wear amount. More specifically, the structures are configured such that the force acting on the pressure plate 16 toward the flywheel is larger than the static friction force acting on the roll pin 73 from the clutch cover 15".

Then, the clutch release operation is performed. When an operator depresses a clutch pedal, a clutch operating mechanism operates the release fork 87 to move the release device 6 toward the second axial side. More specifically, the ends of the release fork 87 come into contact with the engagement portions 86 on the outer peripheral wall 85, and move the entire release device 6 toward the second axial side. Thereby, the release device 6 moves the radially inner ends of the diaphragm spring 44 and lever members 45 toward the second axial side via the retainer 46. As a result, the pushing force applied from the lever members 45 to the pressure plate 16 is released, and the pressure plate 16 biased by the strap plates 41 moves toward the second axial side.

The pressure plate 16 stops when it comes into contact with the end surface, on the first axial sides of the roll pins 73. In this situation, the axial position of the pressure plate 16 is shifted toward the first axial side by the amount of wear from the release position, which it occupied before the wear occurs. Therefore, when the release device 6 reaches the maximum release state, the radially inner end of the lever member 45 is kept in the axially fixed position, but the radially outer end can be axially swingable between the pressure plate 16 and the fulcrum ring 60".

In this state, when the rotation speed is high enough to keep the lock mechanism 90 in the locking state, the adjustment ring 59" can neither rotates nor axially moves so that the wear compensating operation is not performed.

When the rotation speed is low, and the lock mechanism 90 is in the lock releasing state, the following wear compensating operation is performed. The adjustment ring 59" biased by the adjustment spring 61" rotates in the rotating direction R1 with respect to the clutch cover 15" and the fulcrum ring 60". The adjustment ring 59" is moved toward the first axial side by the axial component of the force, which is applied from the inclined surfaces 58a" of the first inclined portions 58" to the inclined surfaces 63a" of the second inclined portions 63". Thereby, the adjustment ring 59" pushes the fulcrum ring 60" toward the first axial side. The fulcrum ring 60" continues its axial movement until the force applying point 51 of the lever member 45 is supported by the pressure plate 16, and further the fulcrum point 52 is supported by the fulcrum ring 60".

Owing to the wear compensating operation described above, the axial position of the fulcrum points 52 of the lever members 45 are shifted toward the first axial side in accordance with the wear amount of the friction facings 4a. As a result, the fulcrum point 52 and the force applying point 51 of each lever member 45 are shifted in the first axial direction in accordance with the wear amount, and therefore the axial position of the force receiving point 50 is constant although the attitude of each lever member 45 is changed. Accordingly, the attitude of the diaphragm spring 44 does not change, and the axial positions of the retainer 46, sleeve 82 and release bearing 84 do not change. Thus, the axial space between the end of the release fork 87 and the engagement portion 86 of the release device 6 as well as the clutch brake gap do not change.

In this embodiment, the relationship between the first and second inclined surfaces 59a" and 59b" of the adjustment ring 59" is appropriately set so that the wear adjustment can be performed in expectation of the wear amount of each of the fulcrum portions of the lever members and the diaphragm spring.

Modifications of Third Embodiment

The invention is not restricted to the clutch device 200 of the above embodiment of the present invention. The invention can be employed in various devices such as a clutch device including only one clutch disk assembly, a clutch device which includes a pushing member formed of only a diaphragm spring or the like, a clutch device which includes pushing members formed of a lever member and independent springs, and a clutch device which is configured to release the clutch by pushing the pushing member toward the flywheel. The provision of the clutch brake is not essential.

Further, the structure of the wear amount detecting mechanism is not restricted to that of the embodiment described above. For example, the frictional engagement member may be engaged with the pressure plate. In the clutch cover assembly according to the invention, since one of the inclined surfaces forming the wedge mechanism is formed integrally with the clutch cover, the parts can be reduced in number.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch cover assembly adapted to be attached to a flywheel for engaging and disengaging a friction member with and from the flywheel, said clutch cover assembly comprising:

a clutch cover configured and adapted to be fixedly coupled to the flywheel to rotate therewith;

a pressure plate movably coupled to said clutch cover in an axial direction and fixedly coupled to said clutch cover in a rotational direction to rotate;

a pushing member movably disposed between said clutch cover and said pressure plate to apply a pushing force on said pressure plate that is directed away from said clutch cover; and a wear compensating mechanism operatively disposed between said clutch cover and said pushing member to axially move a support portion of said pushing member directed away from said clutch cover by an amount corresponding to an amount of wear occurring of the friction member, said wear compensating mechanism including a first inclined surface disposed on a friction member facing side of said clutch cover and extending in a rotating direction, a first ring member rotatably and axially movable with respect to said clutch cover, and having a second inclined surface in complementary contact with said first inclined surface, a biasing member arranged to urge said first ring member in the rotating direction with respect to said clutch cover such that said first ring member moves axially away from said clutch cover, and a restricting mechanism arranged to contact a friction member facing side of said first ring member to selectively control axial movement of said first ring member toward the friction member such that axial movement of said first ring member toward the friction member occurs when the friction member is worn.

2. The clutch cover assembly according to claim 1, wherein said restricting mechanism includes a wear amount detecting member that is axially movably and frictionally engaged with said clutch cover, said wear amount detecting member contacting a stop surface on said friction member facing side of said first ring member for restricting movement of said first ring member toward the friction member such that said wear amount detecting member moves together with said pressure plate toward the friction member to form a space with respect to said first ring member when the friction member is worn.

3. The clutch cover assembly according to claim 2, wherein said friction compensating mechanism further has a second ring member contacting said friction member facing side of said first ring member, said second ring member being non-rotatably and axially movably engaged with said clutch cover, and having a support portion for supporting said pushing member.

4. The clutch cover assembly according to claim 2, wherein said stop surface of said first ring member has a third inclined surface in complementary contact with a fourth inclined surface, said third inclined surface is arranged on said friction member facing side of said wear amount detecting member.

5. The clutch cover assembly according to claim 4, wherein said first and second inclined surfaces have angles of inclination that are different from angles of inclination of said third and fourth inclined surfaces.

6. The clutch cover assembly according to claim 5, wherein said angles of inclination said first and second inclined surfaces are larger than said angles of inclination of said third and fourth inclined surfaces.

7. The clutch cover assembly according to claim 2, wherein said wear amount detecting member includes a first control member having a fourth inclined surface, a second control member frictionally engaged with said clutch cover so as to be axially movable, and a third control member operatively coupled to said pressure plate to move together with said pressure plate toward the friction member to form said space with respect to said first ring member when the friction member is worn.

8. A clutch cover assembly according to claim 7, wherein said first control member is fixedly coupled to said third control member, and said second control member is a cylindrical member having an outer peripheral surface frictionally engaged with an aperture formed in said clutch cover.

9. The clutch cover assembly according to claim 1, wherein said friction compensating mechanism further has a second ring member contacting said friction member facing side of said first ring member, said second ring member being non-rotatably and axially movably engaged with said clutch cover, and having a support portion for supporting said pushing member.

10. The clutch cover assembly according to claim 1, wherein said pushing member includes a diaphragm spring, at least one lever member and a retainer operatively coupled between said diaphragm spring and said at least one lever member.

11. A clutch cover assembly adapted to be attached to a flywheel for engaging and disengaging a friction member with and from the flywheel, said clutch cover assembly comprising:

a clutch cover configured and adapted to be fixedly coupled to the flywheel to rotate therewith;

a pressure plate movably coupled to said clutch cover in an axial direction and fixedly coupled to said clutch cover in a rotational direction to rotate;

a pushing member movably disposed between said clutch cover and said pressure plate to apply a pushing force on said pressure plate that is directed away from said clutch cover; and a wear compensating mechanism operatively disposed between said clutch cover and said pushing member to axially move a support portion of said pushing member directed away from said clutch cover by an amount corresponding to an amount of wear occurring of the friction member, said wear compensating mechanism including a first ring member rotatably arranged on a friction member side of said clutch cover with a friction member facing side of said first ring member having a first inclined surface extending in a rotating direction, a second ring member non-rotatably but axially movable with respect to said clutch cover and disposed on said friction member facing side of said first ring member, and having a second complementary inclined surface on its clutch cover side contacting said first inclined surface and a support portion on its friction member side supporting said pushing member, a biasing member arranged to urge said first ring member in the rotating direction with respect to said clutch cover to move said second ring member axially relative to said first ring member, and a restricting mechanism contacting said friction member facing side of said first ring member to prevent movement of said first ring member toward the friction member, but allow movement of said first ring member toward the friction member when the friction member wears.

12. The clutch cover assembly according to claim 11, wherein said restricting mechanism has a wear amount detecting member that is axially movably and frictionally engaged with said clutch cover, said wear amount detecting member contacting a stop surface on said friction member facing side of said first ring member for restricting movement of said first ring member toward the friction member, and said wear amount detecting member being arranged to move axially with said pressure plate toward the friction member to form a space with respect to said first ring member when the friction member is worn.

13. The clutch cover assembly according to claim 12, wherein said stop surface of said first ring member has a third inclined surface in complementary contact with a fourth inclined surface, said third inclined surface is arranged on said friction member facing side of said wear amount detecting member.

14. The clutch cover assembly according to claim 13, wherein said first and second inclined surfaces have angles of inclination that are different from angles of inclination of said third and fourth inclined surfaces.

15. The clutch cover assembly according to claim 14, wherein said angles of inclination said first and second inclined are larger than said angles of inclination of said third and fourth inclined surfaces.

16. The clutch cover assembly according to claim 12, wherein said wear amount detecting member includes a first control member having a fourth inclined surface, a second control member frictionally engaged with said clutch cover so as to be axially movable, and a third control member operatively coupled to said pressure plate to move together with said pressure plate toward the friction member to form said space with respect to said first ring member when the friction member is worn.

17. A clutch cover assembly according to claim 16, wherein said first control member is fixedly coupled to said third control member, and said second control member is a cylindrical member having an outer peripheral surface frictionally engaged with an aperture formed in said clutch cover.

18. A clutch cover assembly adapted to be attached to a flywheel for engaging and disengaging a friction member with and from the flywheel, said clutch cover assembly comprising:

a clutch cover configured and adapted to be fixedly coupled to the flywheel to rotate therewith;

a pressure plate movably coupled to said clutch cover in an axial direction and fixedly coupled to said clutch cover in a rotational direction to rotate;

a pushing member movably disposed between said clutch cover and said pressure plate to apply a pushing force on said pressure plate that is directed away from said clutch cover; and a wear compensating mechanism operatively disposed between said clutch cover and said pushing member to axially move a support portion of said pushing member directed away from said clutch cover by an amount corresponding to an amount of wear occurring of the friction member, said wear compensating mechanism being axially aligned with an outermost portion of said pushing member, said wear compensating mechanism including a first inclined surface integrally formed with a surface on a friction member facing side of said clutch cover and extending in a rotating direction, a first ring member having a second inclined surface that is in complementary contact with said first inclined surface, and being axially movable and rotatable with respect to said clutch cover, and a biasing member arranged to urge said first ring member in the rotating direction with respect to said clutch cover to move said first ring member axially relative to said clutch cover.

19. The clutch cover assembly according to claim 18, wherein said wear compensating mechanism further includes a second ring member arranged to contact a friction member facing side of said first ring member such that said second ring member is non-rotatably but axially movable with respect to said clutch cover, and said second ring member having a support portion for supporting said pushing member.

20. The clutch cover assembly according to claim 18, wherein said biasing member is configured to function between said first and second ring members.

21. The clutch cover assembly according to claim 20, wherein
said biasing member is disposed in a space formed between said first and second ring members.

22. The clutch cover assembly according to claim 18, wherein
said wear compensating mechanism further includes a wear amount detecting member that is axially movably and frictionally engaged with said clutch cover, and said wear amount detecting member being operatively coupled to move axially with said pressure plate toward the friction member when the friction member is worn.

23. The clutch cover assembly according to claim 18, wherein
said pushing member includes a diaphragm spring, at least one lever member and a retainer operatively coupled between said diaphragm spring and said at least one lever member.

24. The clutch cover assembly according to claim 18, wherein
said wear compensating mechanism further includes a stop mechanism operatively coupled to said first ring member and arranged to operate by centrifugal force to prevent relative rotation of said first ring member with respect to said clutch cover upon rotation of said clutch cover assembly above a predetermined speed.

25. The clutch cover assembly according to claim 24, wherein
said stop mechanism includes a lock member movably coupled to said clutch cover between a release position and a stopping position.

26. The clutch cover assembly according to claim 25, wherein
said lock member is normally urged to said stopping position by a spring member.

27. The clutch cover assembly according to claim 26, wherein
said first ring member includes teeth that are arranged to be engaged by said lock member when said clutch cover assembly rotates above said predetermined speed.

* * * * *